United States Patent [19]
Murakami et al.

[11] Patent Number: 5,661,744
[45] Date of Patent: Aug. 26, 1997

[54] EXCIMER LASER BEAM IRRADIATION APPARATUS FOR OPTICALLY PROCESSING WORKPIECE

[75] Inventors: Kazuyuki Murakami; Hajime Nakatani; Atsushi Sugitatsu; Tadao Minagawa; Toshinori Yagi; Keiko Ito, all of Amagasaki, Japan

[73] Assignee: Mitsubishi Denki Kabushiki Kaisha, Tokyo, Japan

[21] Appl. No.: 512,710

[22] Filed: Aug. 8, 1995

[30] Foreign Application Priority Data

Aug. 30, 1994 [JP] Japan .................................. 6-204972

[51] Int. Cl.$^6$ .............................. H01S 3/22; H01S 3/223
[52] U.S. Cl. ................................................ 372/57; 372/38
[58] Field of Search ................................ 372/38, 57, 99, 372/101

[56] References Cited

U.S. PATENT DOCUMENTS

| | | |
|---|---|---|
| 5,223,693 | 6/1993 | Zumoto et al. . |
| 5,260,961 | 11/1993 | Zhou et al. ............................... 372/57 |
| 5,310,986 | 5/1994 | Zumoto et al. . |
| 5,386,430 | 1/1995 | Yamagishi et al. ....................... 372/57 |

FOREIGN PATENT DOCUMENTS 3331598  3/1984  Germany .

OTHER PUBLICATIONS

Development Of Excimer Laser Processing Apparatus For Mass Production, Excerpt of Collection of Theses in 28$^{-1}$h Convention of Laser Processing Engineers of Japan, pp. 51–58, (1992), Jul. 28, 1992.

*Primary Examiner*—Rodney B. Bovernick
*Assistant Examiner*—Robert E. Wise
*Attorney, Agent, or Firm*—Oblon, Spivak, McClelland, Maier & Neustadt, P.C.

[57] ABSTRACT

An excimer laser beam irradiation apparatus capable of processing a workpiece optimally with an excimer irradiation beam even when intensity distribution of the excimer laser beam undergone multiple reflections is non-uniform. A patterning mask has light-transmissive portions for allowing the excimer laser beam to pass through and a reflecting layer for reflecting it. A high reflectivity mirror disposed in opposition to the reflecting layer reflects the excimer laser beam reflected from the reflecting layer toward the patterning mask. An imaging lens images a pattern of the excimer laser beam transmitted through the patterning mask onto a workpiece for irradiation thereof. A workpiece moving mechanism and a mask moving mechanism move the workpiece and the mask moving mechanism, respectively. A control unit controls the workpiece moving mechanism and the mask moving mechanism such that the patterning mask and the workpiece are displaced along a same axis synchronously with each other in a scan moving direction which coincides with a direction in which the excimer laser beam shifts positionally while being reflected between the patterning mask and the reflecting means, for thereby allowing the workpiece to be scanned with the excimer laser beam. The workpiece can be processed uniformly and stably in accordance with a pattern of the patterning mask with high accuracy and reliability.

20 Claims, 16 Drawing Sheets

ETCHING RATE $e$

SCAN MOVING SPEED $v$ | OSCILLATION REPETITION FREQUENCY $f$

BEAM
INTENSITY
DISTRIBUTION
(ON THE
WORKPIECE)

EXCIMER LASER BEAM IRRADIATION APPARATUS FOR OPTICALLY PROCESSING WORKPIECE

BACKGROUND OF THE INVENTION

1. Field of the Invention

The present invention generally relates to an excimer laser beam irradiation apparatus used for optically machining or working or processing (e.g. etching) a workpiece such as, for example, a multi-layer printed substrate to thereby form apertures, holes exemplified by so-called via-holes, through-holes and the like by illuminating or irradiating the substrate with an excimer laser beam through a patterning mask having a pattern to be formed in the workpiece. More particularly, the present invention is concerned with an excimer laser beam irradiation apparatus which can allows workpieces to be processed in a stable state with a uniformized intensity distribution of the excimer laser beam.

2. Description of Related Art

For a better understanding of the concept underlying the present invention, description will first be made in some detail of a hitherto known excimer laser beam irradiation apparatus employed in the conventional optical processing or machining equipment of the above-mentioned type by reference to FIGS. 14 and 16 of the drawings, in which FIG. 14 is a perspective view showing only schematically a typical one of the optical processing apparatuses known heretofore. For more particular of this known apparatus, reference should be made to "Collection of Theses in 28-th Convention of Laser Processing Engineers of Japan (28-th LASER NETSUKAKO KENKYUKAI RONBUNSHU)", pp. 51–58, (July, 1992).

Referring to FIG. 14, the optical processing apparatus illustrated therein includes a light source system constituted by an excimer laser oscillator 1 for generating an excimer laser beam L0 having a rectangular shape in cross section. Disposed at positions downstream of an output port of the laser oscillator 1 along an optical path of the excimer laser beam L0 are three mirrors 3a, 3b and 3c which cooperate to constitute a beam path adjusting system for adjusting a beam direction and a beam rotation angle of the excimer laser beam L0 emitted from the excimer laser oscillator 11.

On the other hand, disposed in succession to the beam path adjusting system mentioned above along the optical path of the excimer laser beam L0 is a beam shaping optical system which is composed of two sets of concave and convex cylindrical lenses 4a, 4b; 4c, 4d for converting or shaping the excimer laser beam L0 of rectangular cross-section into a sheet-like or flat excimer laser beam L1, wherein the convex lenses 4a and 4c are disposed in opposition to the concave lenses 4b and 4d, respectively. These lens elements are fixedly mounted on a stationary support 5. The excimer laser beam L1 leaving the beam shaping optical system (4a, 4b; 4c, 4d) is reflected by an incident-angle adjusting mirror 7 disposed on the optical path of the excimer laser beam L1.

A patterning mask 8 onto which the excimer laser beam L1 impinges, as projected by the incident-angle adjusting mirror 7, is composed of a light-transmissive base plate or substrate 8a which allows the excimer laser beam L1 to transmit therethrough. Deposited over the light-transmissive substrate 8a are a reflecting layer 8b for reflecting the excimer laser beam L1, wherein through-holes or apertures 8c allowing the excimer laser beam L1 to pass therethrough are formed in the reflecting layer 8b. Needless to say, these through-holes or apertures 8c form a pattern to be imaged or transferred to a workpiece, as will hereinafter be described in more detail.

Disposed in association with the patterning mask 8 is a mask moving mechanism 9 provided for moving the patterning mask 8 in directions orthogonal to the optical axis, i.e., in the x- and y-directions to thereby cause the excimer laser beam L1 to scan the top surface of the patterning mask 8 in the relative sense.

Disposed above and in opposition to the patterning mask 8 is a high reflectivity mirror 10 which serves as a reflecting means for redirecting the excimer laser beam L1 reflected at the reflecting layer 8b toward the patterning mask 8 repetitively, as described later on.

On the other hand, an imaging lens 11 is disposed underneath the patterning mask 8 at a position on the optical path of the excimer laser beam L2 which leaves the patterning mask 8. A workpiece 12 to be optically processed (or optically machined) is illuminated or irradiated with the excimer laser beam L2 having passed through the imaging lens 11 whose function is to transfer the aforementioned pattern formed in the patterning mask 8 onto the workpiece 12 in the form of an inverted image.

A workpiece mounting platform 13 is disposed beneath the imaging lens 11 for mounting and positioning the workpiece 12. On the other hand, the workpiece mounting platform 13 is supported on a workpiece moving mechanism 14 which is adapted to be moved in directions orthogonal to the optical axis of the imaging lens 11, i.e., in the x- and y-directions, respectively. The workpiece moving mechanism 14 in turn is mounted on a vibration isolating common bed 15.

Operations of both the mask moving mechanism 9 and the workpiece moving mechanism 14 are controlled with high accuracy by a control unit 16 which may be constituted by a microcomputer and which is also in charge of controlling the excimer laser oscillator 1. Additionally, provided is a processing monitor system 17 which is disposed above the workpiece 12 for the purpose of inspecting the positions and geometrical factors of the pattern formed in the workpiece 12.

Description will now be made by reference to FIGS. 15A and 15B, in which FIG. 15A is a side elevational view showing schematically and exaggeratedly an optical system including the patterning mask 8, the imaging lens 11 and associated parts, and FIG. 15B is a view for graphically illustrating an intensity distribution of the excimer laser beam L2 on the workpiece 12 as viewed along the y-direction. At this juncture, it is presumed that the excimer laser beam L1 undergone multiple reflections between the patterning mask 8 an the high reflectivity mirror 10 is shifted in the y-axis direction.

Referring to FIG. 15A, the light-transmissive base plate or substrate 8a of the patterning mask 8 is formed of a synthetic quartz material and allows the excimer laser beam L1 leaving the lens system (4a–4d) and reflected at the incident angle adjusting mirror 7 to pass therethrough by way of the light passing holes or apertures 8c. As a result of the irradiation with the excimer laser beam L2 passed through the masks 8 and the imaging lens 11, holes such as the via-holes 18 are formed in the workpieces 12 in a pattern corresponding to that of the holes 8c of the patterning mask 8. The reflecting layer 8b is deposited over the light-transmissive substrate 8a through a vapor deposition process with the hollow holes 8c being left in a predetermined pattern to be transferred to the workpiece 12. On the other hand, the reflecting layer 8b is formed in the form of a film such as an aluminum film, a multi-layer dielectric film or the like which exhibits a high reflectivity (e.g., reflectivity not less than 99%). As mentioned above, the reflecting layer 8b is pierced with a large number of hollow holes 8c each having a diameter, for example, on the order of 20 μm.

The imaging lens 11 is implemented as a high performance lens having aberrations suppressed to a possible minimum over a region of a large field angle for imaging the pattern formed in the patterning mask 8, i.e., pattern of the hollow holes 8c onto the workpiece 12 with high accuracy.

Parenthetically, FIG. 16A is a side view showing schematically and exaggeratedly the processing optical system and associated parts, as viewed in the y-axis direction, and FIG. 16B is a view for illustrating intensity distribution of the excimer laser beam L2 on the workpiece 12, as viewed in the x-axis direction.

Next, referring to FIGS. 14 to 16, description will be made of operation of the excimer laser beam irradiation apparatus of the structure elucidated above.

First, referring to FIG. 15A, a part of light rays of the excimer laser beam L1 incident on the patterning mask 8 at a lateral side thereof (at a right-hand side as viewed in the figure) obliquely from the above transmits through the hollow holes 8c to form the excimer laser beam L2 which contributes to the optical processing or etching.

The other part of the light rays of the excimer laser beam L1 incident on the patterning mask 8 is reflected by the reflecting layer 8b toward the high-reflectivity mirror 10 which reflects back the incident light rays again onto the patterning mask 8.

As can be seen in FIG. 15A, a part of the excimer laser beam L1 reflected toward the patterning mask 8 by the high-reflectivity mirror 10 is caused to shift progressively in the y-direction (i.e., from the right to the left, as viewed in FIG. 15A) due to reflections between the patterning mask 8 and the workpiece 10 and incidence of the excimer laser beam L1 with an incident angle θ smaller than 90° relative to the vertical. More specifically, the position at which the excimer laser beam L1 impinges on the patterning mask 8 at a second time after reflection at the high-reflectivity mirror 10 is deviated in the y-direction (i.e., to the left, as viewed in FIG. 15A) from the position at which the excimer laser beam L1 impinges on the patterning mask 8 at the first time. Such reflection and shift of the excimer laser beam L1 is repeated until the excimer laser beam L1 leaves the cavity defined between the patterning mask 8 and the high-reflectivity mirror 10, although some part of the excimer laser beam L1 is allowed to pass through the patterning mask 8 via the pattern of hollow holes 8c.

Owing to the repetitive or multiple reflections of the excimer laser beam L1 between the patterning mask 8 and the high reflectivity mirror 10 and the shifts in the y-direction, the pattern holes 8c of the patterning mask 8 is transferred to the workpiece 12 by way of the imaging lens 11. In that case, it is naturally required to maintain the intensity of the excimer laser beam L1 substantially at a predetermined constant level, being protected against attenuation. Of course, the excimer laser beam L2 transmitted through the pattern holes 8c of the patterning mask 8 is focused onto the workpiece 12 via the imaging lens 11. As a result of this, apertures or holes such as the via-holes 18 are formed in the workpiece 12 in a pattern corresponding to an inverted image of the pattern of the holes 8c formed in the patterning mask 8.

In practical applications, it is naturally noted that there arises a possibility of the intensity of the excimer laser beam L1 becomes gradually lower as the excimer laser beam L1 moves from one end of the high reflectivity mirror 10 to the other end in the y-axis direction while being reflected between the patterning mask 8 and the high reflectivity mirror 10, as can be seen in FIG. 15B. As a consequence of this, the intensity of the excimer laser beam L2 impinging onto the workpiece 12 gradually decreases in the course of the reflections and the positional shifts in dependence on the positions along the y-axis in the opposite direction (i.e., in a minus (−) y-axis direction) because the pattern of the patterning mask 8 imaged onto the workpiece 12 is inverted.

On the other hand, when viewed in the x-axis direction (see FIG. 16A), the excimer laser beam L1 incident at a center portion of the high reflectivity mirror 10 undergoes successive reflections between the patterning mask 8 and the high reflectivity mirror 10 in the directions toward both ends, as a result of which the intensity distribution of the excimer laser beam L2 in the x-axis direction will assume such a profile as illustrated in FIG. 16B.

In conjunction with the imaging lens 11, it is further noted that the imaging lens 11 is realized by a high-performance lens system whose aberrations are suppressed to a possible minimum over a major region of the image plane, as mentioned previously, in order to optically transfer or image the pattern of the patterning mask 8 onto the workpiece 12 with high accuracy. Thus, in the case where the workpiece 12 is, for example, a multi-layer printed substrate, the size thereof is usually on the order of 100 mm×100 mm. Accordingly, when this area is to be optically processed in a single step, the lens system of extremely expensiveness has to be employed as the imaging lens 11.

Such being the circumstances, in the optical processing apparatus known heretofore, the optical processing over a large area of the workpiece 12 is realized by moving both the patterning mask 8 and the workpiece 12 in synchronism by using the mask moving mechanism 9 and the workpiece moving mechanism 14 to thereby effectively scan the workpiece 12 with the positionally stationary excimer laser beam L2 in the relative sense.

By way of example, when the magnification of the imaging lens 11 is "½", the patterning mask 8 is scanned with the excimer laser beam L1 at a speed v in the x-axis direction while the workpiece 12 on which the inverted image of the hole pattern of the patterning mask 8 is to be copied is simultaneously scanned in the opposite direction (i.e., minus (−) x-direction) at a speed of v/2. Upon completion of the scanning in the x-direction, the workpiece 12 is displaced stepwise in the y-direction to perform again the scanning operation mentioned above. By repeating the scanning operation in this way, the whole surface of the workpiece 12 can optically be processed.

Subsequently, upon completion of the scanning displacement of the patterning mask 8 and the workpiece 12 in the x-axis direction, the patterning mask 8 and the workpiece 12 are fed stepwise by one increment in the y-axis direction, whereupon the scanning displacement mentioned above is sequentially repeated. Thus, the whole surface of the workpiece 12 is illuminated or irradiated with the excimer laser beam.

In this conjunction, it is however noted that the pattern which is not uniformized (i.e., not constant) in respect to the intensity distribution, as shown in FIG. 15B, is imaged onto the workpiece 12.

As will now be understood from the above description, in the case of the hitherto known excimer laser beam irradiation apparatus for the optical processing, the patterning mask 8 and the workpiece 12 are moved for scanning the latter with the excimer laser beam L2 in the direction (x-axis direction) orthogonal to the direction (y-axis direction) in which the excimer laser beam L1 shifts while undergoing multiple reflections between the patterning mask 8 and the high reflectivity mirror 10. Consequently, the intensity distribution of the excimer laser beam L1 undergoing the multiple reflections between the patterning mask 8 and the high reflectivity mirror 10 can not always be maintained to be essentially constant or uniform. Thus, there may arise such a situation that the intensity distribution of laser beam irradiation can not be realized uniformly over the workpiece 12. Under the circumstances, the processed state of the workpiece 12 may become non-uniform although it depends on the material of the workpiece 12, the processing or working precision attainable with the optical system and other factors as well, giving rise to a serious problem.

Moreover, in the conventional excimer laser beam irradiation apparatus, variation in the thickness and the material of the workpiece 12 as well as variation in the speed at which the patterning mask 8 and the workpiece 12 are moved for the scanning operation provide obstacles to realization of the uniform processing of the workpiece 12 to a disadvantage.

SUMMARY OF THE INVENTION

In the light of the state of the art described above, it is an object of the present invention to provide an excimer laser beam irradiation apparatus for processing optically a workpiece, which apparatus is capable of performing a processing on a workpiece uniformly even when the intensity distribution of an excimer laser beam undergoing multiple reflections as mentioned hereinbefore is not uniform in the direction in which the excimer laser beam shifts while being reflected concurrently.

Another object of the present invention is to provide an excimer laser beam irradiation apparatus which is capable of performing a processing on a workpiece uniformly nevertheless of variations in a scan moving speed at which the mask and the workpiece are moved in synchronism with each other for effectuating the scanning operation.

In view of the above and other objects which will become apparent as the description proceeds, there is provided according to a general aspect of the present invention an excimer laser beam irradiation apparatus for processing a workpiece by using an excimer laser beam, which apparatus comprises an excimer laser oscillator for emitting an excimer laser beam, a patterning mask having light-transmissive portions for allowing the excimer laser beam emitted from the excimer laser oscillator to pass therethrough and a reflecting layer for reflecting the excimer laser beam, the light-transmissive portions forming a pattern to be formed in the workpiece, a high reflectivity mirror disposed in opposition to the reflecting layer of the patterning mask for reflecting the excimer laser beam reflected from the reflecting layer toward the patterning mask so that the excimer laser beam undergoes multiple refections between the reflecting mirror and the patterning mask while being positionally shifted, an imaging lens for imaging a pattern of the excimer laser beam transmitted through the patterning mask onto the workpiece for irradiation thereof, a workpiece moving mechanism for moving the workpiece in a direction orthogonal to an optical axis of the imaging lens, a mask moving mechanism for moving the patterning mask in a direction orthogonal to the optical axis of the imaging lens, and a control unit for controlling the excimer laser oscillator, the workpiece moving mechanism and the mask moving mechanism. The control unit controls the workpiece moving mechanism and the mask moving mechanism such that the patterning mask and the workpiece are displaced synchronously with each other along a same axis for allowing the workpiece to be scanned with the excimer laser beam during a synchronous scanning displacement in a scan moving direction which coincides with a direction in which the excimer laser beam positionally shifts while undergoing the multiple reflections between the patterning mask and the high reflectivity mirror.

The excimer laser oscillator and the high reflectivity mirror may be disposed stationarily. The high reflectivity mirror and the patterning mask are disposed substantially in parallel to each other. The excimer laser beam is caused to impinge onto the patterning mask at a predetermined angle of inclination without being interfered by the high reflectivity mirror. The patterning mask and the workpiece may be moved along the same axis in directions opposite to each other during the synchronous scanning displacement.

By virtue of the arrangement in which the direction of the synchronous scanning displacement of the mask and the workpiece coincides with the reflectional shift direction of the excimer laser beam, as described above, proper or appropriate process or work energy can be imparted to the workpiece for forming a desired pattern with high accuracy and reliability even When the uniformized intensity distribution of the excimer laser beam undergone the multiple reflections can not always be ensured.

In a preferred mode for carrying out the invention, the control unit may be so designed as to control the workpiece moving mechanism and the mask moving mechanism such that a distance for which the patterning mask and the workpiece are displaced synchronously while being scanned with the excimer laser beam becomes longer than a length of an effective pattern area of the patterning mask in which a pattern to be imaged onto the workpiece is formed.

By selecting the distance for which the mask and the workpiece are displaced upon scanning operation so as to be greater than the distance for which the effective pattern area on the mask is displaced in the scan moving direction, as mentioned above, the intensity distribution of the excimer laser beam over the effective pattern area can further be uniformized, whereby the process or work energy acting on the workpiece can be made more appropriate.

In another preferred mode for carrying out the invention, the control unit may be so designed as to select positions at which the patterning mask and the workpiece are, respectively, caused to start the synchronous scanning displacement such that the patterning mask and the workpiece are displaced at a stabilized speed during the synchronous scanning displacement at least over a distance which corresponds to an area of the workpiece to be irradiated with the excimer laser beam.

With the structure in which the start point for the scanning displacement of the mask and the workpiece is determined such that the region where the synchronous scan moving speed of the mask and the workpiece coincides with the area of the workpiece irradiated with the excimer laser beam, to thereby prevent the effective pattern area from overlapping a region where the scan moving speed is likely to change upon starting of the scanning displacement, as described above, it can be ensured that the irradiation with the excimer laser beam is performed in the region where the scan moving speed is stabilized. In this way, the intensity distribution of the excimer laser beam on the effective pattern area of the workpiece can further be uniformed, whereby the processing of the workpiece can be accomplished with enhanced accuracy and reliability.

In yet another preferred mode for carrying out the invention, the excimer laser beam irradiation apparatus may further include a speed measuring unit for detecting a speed at which the patterning mask and the workpiece are moved during the synchronous scanning displacement. The control unit may then be so designed that when the speed measuring unit detects that a scan moving speed at which the patterning mask and the workpiece are displaced during the synchronous scanning displacement changes within an area irradiated with the excimer laser beam, the control unit controls an oscillation repetition frequency of the excimer laser oscillator so that it decreases below a predetermined frequency when the scan moving speed is lower than a predetermined speed. While the control unit controls the oscillation repetition frequency so that it increases beyond the predetermined frequency when the scan moving speed is higher than the predetermined speed.

Owing to such arrangement that when the synchronous scanning speed of the mask and the workpiece varies within the area of the workpiece which is irradiated with the excimer laser beam, the oscillation repetition frequency of the excimer laser oscillator is decreased below a predetermined frequency when the scan moving speed is lower than a predetermined speed, whereas when the scan moving speed is higher than the predetermined speed, the oscillation repetition frequency is increased beyond the predetermined frequency (i.e., by controlling the oscillation repetition frequency while taking into consideration the variation in the scan moving speed, as described above), the intensity distribution of the excimer laser beam can be much uniformized over the effective pattern area on the workpiece, whereby the workpiece can be processed with optimal work energy.

In still another preferred mode for carrying out the invention, the excimer laser beam irradiation apparatus may further include a thickness deviation sensor for measuring a thickness of the workpiece. The control unit may then be so designed such that when the thickness deviation sensor detects that a thickness of the workpiece changes during the synchronous scanning displacement, the control unit controls an oscillation repetition frequency of the excimer laser oscillator so that it increases beyond a predetermined frequency when the thickness of the workpiece is greater than a predetermined thickness, whereas the control unit controls the oscillation repetition frequency so that it decreases below the predetermined frequency when the thickness of the workpiece is smaller than the predetermined thickness.

The predetermined frequency and the predetermined thickness may be so selected that the workpiece having the predetermined thickness can be processed uniformly and stably with the excimer laser beam having the predetermined frequency when the workpiece is moved at a given speed during the synchronous scanning displacement.

With the arrangement that the oscillation repetition frequency of the excimer laser oscillator is increased beyond a predetermined frequency when the thickness of the workpiece is greater than a predetermined thickness, whereas the oscillation repetition frequency is decreased below the predetermined frequency when the thickness of the workpiece is smaller than the predetermined thickness, as stated above, optimal work energy can be applied to the workpiece effectively uniformly over the area to be processed regardless of variations in the thickness of the workpiece.

In a further preferred mode for carrying out the invention, the control unit may be designed such that when the thickness deviation sensor detects that a thickness of the workpiece changes during the synchronous displacement, the control unit controls a scan moving speed of the patterning mask and the workpiece during the synchronous scanning displacement so that it decreases below a predetermined speed when the thickness of the workpiece is greater than a predetermined thickness, whereas the control unit controls the scan moving speed of the patterning mask and the workpiece so that it increases beyond the predetermined speed when the thickness of the workpiece is smaller than the predetermined thickness.

By deceasing the scan moving speed of the workpiece below a predetermined speed when the thickness of the workpiece is greater than a predetermined thickness, while increasing the scan moving speed of the workpiece beyond the predetermined speed when the thickness of the workpiece is smaller than the predetermined thickness, as described above, optimal processing energy can be applied to the workpiece effectively uniformly over the area to be processed notwithstanding of variations in the thickness of the workpiece.

In a yet further preferred mode for carrying out the invention, the excimer laser beam irradiation apparatus may further include a workpiece processability decision means for deciding whether a material of the workpiece is difficult to process or easy to process. The control unit may then be so designed that when it is detected by the workpiece processability decision means that a material of the workpiece changes within an irradiated area of the excimer laser beam during the synchronous scanning displacement, the control means controls an oscillation repetition frequency of the excimer laser oscillator so that it decreases below a predetermined frequency when a material of the workpiece is easy to process, whereas the control unit controls the oscillation repetition frequency so that it increases beyond the predetermined frequency when the material of the workpiece is difficult to process.

The processing difficulty and the processing easiness may be previously determined in terms of an etching rate at which the material of the workpiece is etched away under irradiation of a single-shot pulse of the excimer laser beam. The information concerning the processing difficulty and the processing easiness of the workpiece material may be stored in a memory for each of regions within an area of the workpiece which is to be irradiated with the excimer laser beam, the regions differing one another in respect to the material. The memory and the workpiece processability decision means may be incorporated in the control unit.

By decreasing the oscillation repetition frequency of the excimer laser oscillator below a predetermined frequency when a material of the workpiece is easy to process while increasing the oscillation repetition frequency beyond the predetermined frequency when the material of the workpiece is difficult to process, as stated above, optimal work energy can be applied to the workpiece effectively uniformly over the area to be processed regardless of variations in the material of the workpiece.

In a still further preferred mode for carrying out the invention, the excimer laser beam irradiation apparatus may further include a workpiece processability decision means for deciding whether a material of the workpiece is difficult to process or easy to process. The control unit may then be so designed that when it is detected by the workpiece processability decision means that a material of the workpiece changes within an irradiated area of the excimer laser beam during the synchronous scanning displacement, the control means controls the scan moving speed of the patterning mask and the workpiece during the synchronous scanning displacement so that it increases beyond a predetermined speed when a material of the workpiece is easy to process, while the control unit controls the scan moving speed of the patterning mask and the workpiece so that it decreases below the predetermined speed when the material of the workpiece is difficult to process.

By increasing the scan moving speed of the mask and the workpiece beyond the predetermined speed when a material of the workpiece is relatively easy to process while deceasing the scan moving speed below the predetermined speed when the material of the workpiece is relatively difficult to process, as mentioned above, optimal processing energy can be applied to the workpiece effectively uniformly over the area to be processed notwithstanding of variations in the material of the workpiece.

In a preferred mode for carrying out the invention, the mask moving mechanism and the workpiece moving mechanism may include a stepwise feeding means for displacing stepwise the patterning mask and the workpiece under the control of the control unit in a direction orthogonal to both an optical axis of the imaging lens and the scan moving direction in which the patterning mask and the workpiece are moved during the synchronous scanning displacement, for thereby allowing irradiation of the workpiece with the excimer laser beam to be repeated in the orthogonal direction. The stepwise displacement in the orthogonal direction is selected to be smaller than a reflectional shift distance for which the impinging excimer laser beam shifts positionally in the orthogonal direction while undergoing multiple reflections between the patterning mask and the high reflectivity mirror.

By setting the stepwise feeding increment in the orthogonal direction to be smaller than the length of the reflectional shift distance of the excimer laser beam, as described above, the intensity distribution of the excimer laser beam can be uniformized over the effective pattern area in the stepwise feeding direction, whereby the optimal work energy can be made to act on the workpiece.

In another preferred mode for carrying out the invention, the control unit may be so designed as to control the scan moving speed of the patterning mask and the workpiece so that an inter-pulse scanning displacement for which the patterning mask and the workpiece are moved in the scan moving direction during a period intervening successive pulses of the excimer laser beam becomes smaller than the reflectional shift distance for which the excimer laser beam positionally shifts while undergoing multiple reflections between the patterning mask and the high reflectivity mirror.

With the arrangement for controlling the scan moving speed of the mask and the workpiece so that the inter-pulse scanning displacement of the mask and the workpiece during the synchronous scanning displacement becomes smaller than the reflectional shift distance of the excimer laser beam, as stated above, the intensity distribution of the excimer laser beam can be uniformized over the effective pattern area, whereby the optimal work energy applied to the workpiece can further be uniformized.

In yet another preferred mode for carrying out the invention, the control unit may be so designed as to control the oscillation repetition frequency of the excimer laser oscillator so that an inter-pulse scanning displacement for which the patterning mask and the workpiece are moved in the scan moving direction during a period intervening successive pulses of the excimer laser beam becomes smaller than the reflectional shift distance for which the excimer laser beam shifts positionally while undergoing multiple reflections between the patterning mask and the high reflectivity mirror.

By controlling the oscillation repetition frequency of the excimer laser oscillator such that the inter-pulse scanning displacement of the mask and the workpiece during the synchronous scanning displacement becomes smaller than the reflection shift distance of the excimer laser beam, as described above, it is possible to further uniformize the intensity distribution of the excimer laser beam over the effective pattern area on the workpiece, which thus can be processed with optimal work energy.

In a further preferred mode for carrying out the invention, the control unit may be so designed as to stop the operation of the excimer laser oscillator for an irradiation-unnecessary region during the synchronous scanning displacement, if the irradiation-unnecessary region is present in an area to be irradiated with the workpiece.

The information concerning irradiation-unnecessary region may be stored in a memory provided in association with the control unit.

By stopping or interrupting the operation of the excimer laser oscillator for an irradiation-unnecessary region during the synchronous scanning displacement when such irradiation-unnecessary region exists in the irradiated area of the workpiece, as described above, it is possible to suppress the useless consumption of the irradiation energy and hence the laser driving power, whereby the use life of the excimer laser beam irradiation apparatus can be extended.

In a yet further preferred mode for carrying out the invention, the excimer laser beam irradiation apparatus may further include an intercepting plate which can selectively be inserted into an optical path of the excimer laser beam under the control of the control unit. The control unit inserts the intercepting plate in the optical path during the synchronous scanning displacement of the patterning mask and the workpiece for inhibiting the excimer laser beam from irradiating the workpiece for an irradiation-unnecessary region, if the irradiation-unnecessary region is present in an area to be irradiated with the workpiece.

By inserting the intercepting plate in the optical path during the synchronous scanning displacement to thereby inhibit the excimer laser beam from irradiating the workpiece in the irradiation-unnecessary region, if present in the irradiated area of the workpiece, as described above, the useless consumption of the irradiation energy and hence that of the laser driving power can be obviated, Whereby the use life of the excimer laser beam irradiation apparatus can be extended.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

Figure 1:
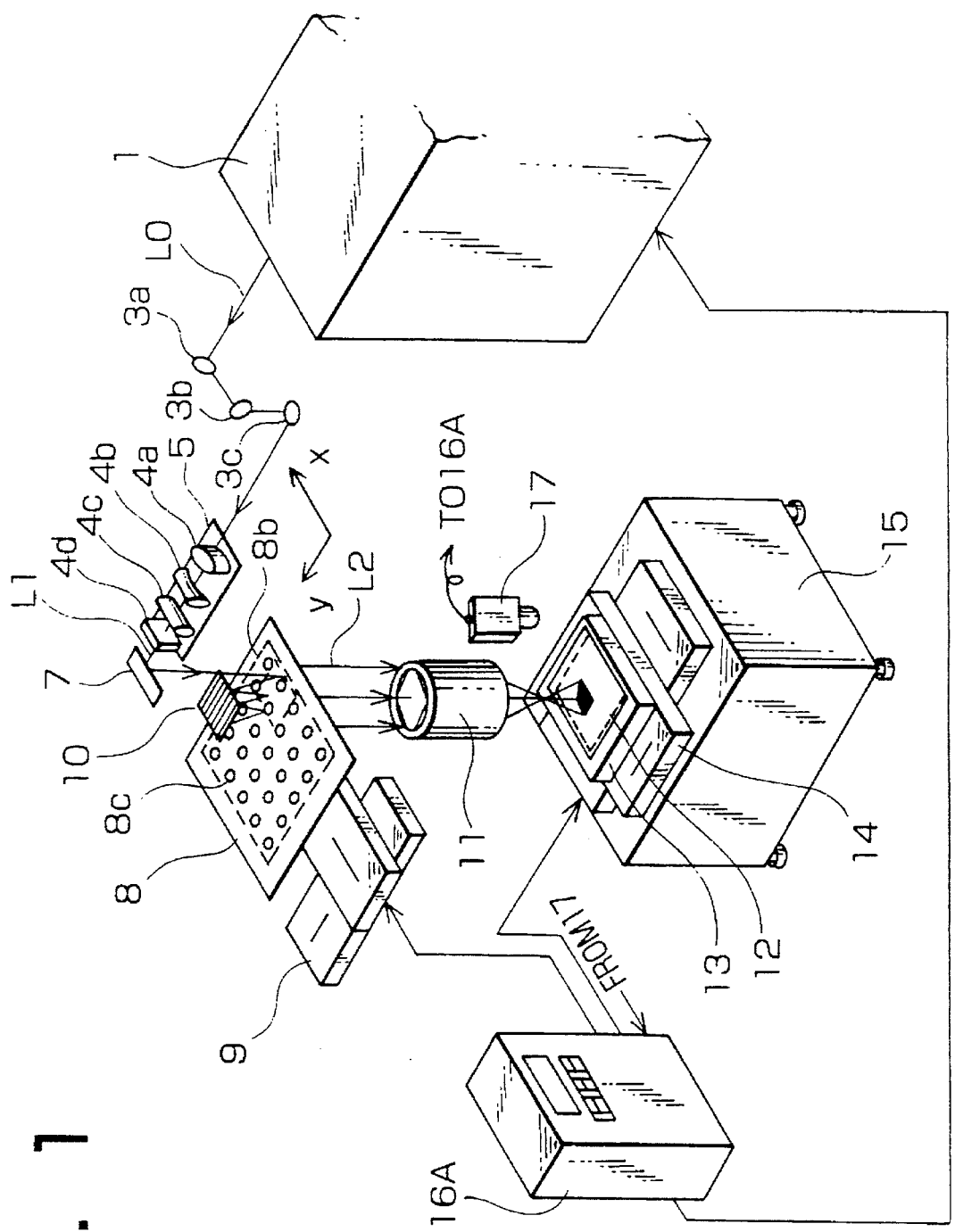
FIG. 1 is a perspective view showing schematically a general arrangement of an excimer laser beam irradiation apparatus according to a first embodiment of the present invention.

Now, the present invention will be described in detail in conjunction with what is presently considered as preferred or typical embodiments thereof by reference to the drawings. In the following description, like reference characters designate like or corresponding parts throughout the several views. Also in the following description, it is to be understood that such terms as "left", "right", "top", "bottom", "x-axis direction", "y-axis direction" and the like are words of convenience and are not to be construed as limiting terms.

Embodiment 1

Figure 14:
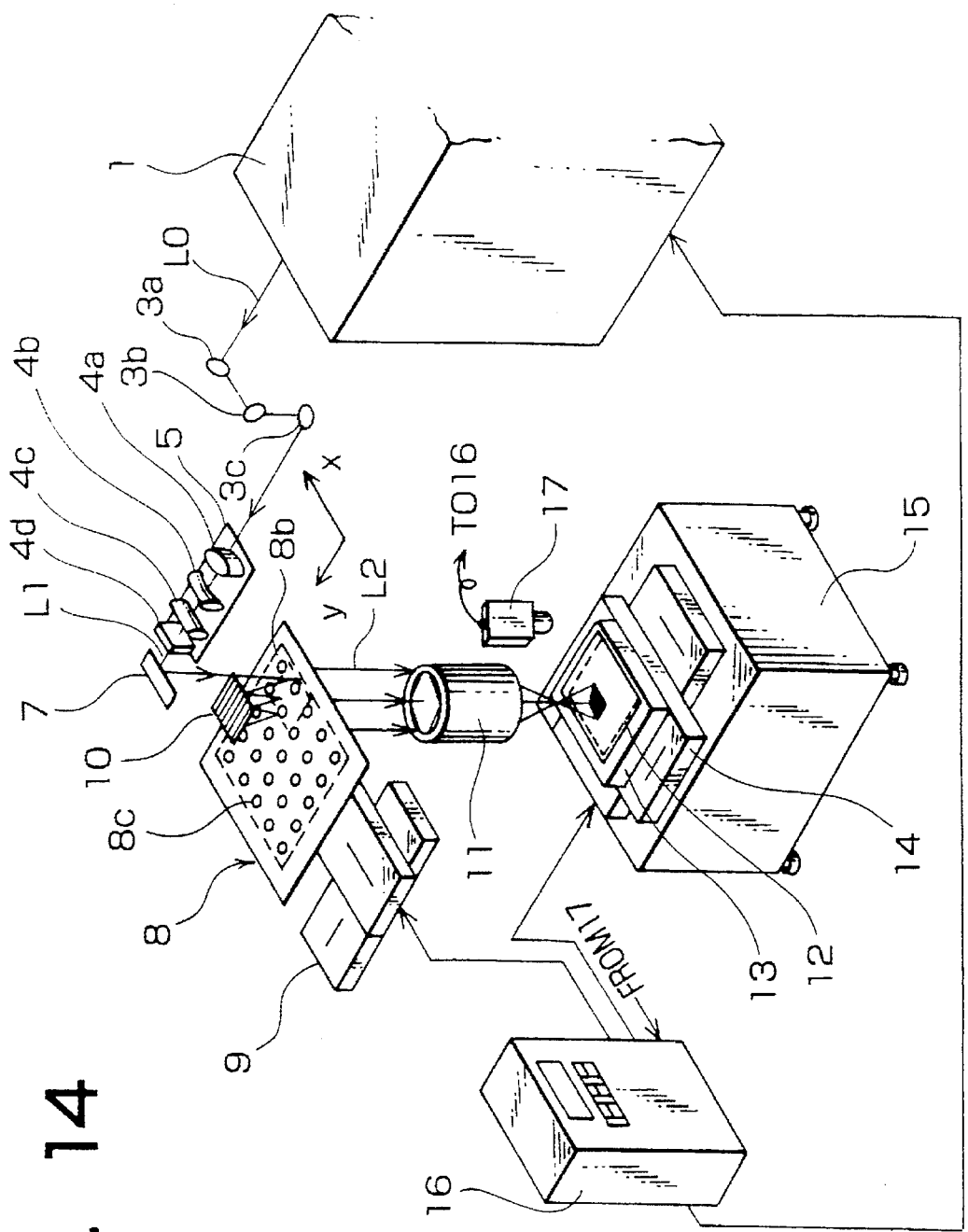
FIG. 14 shows a typical one of optical processing apparatuses known heretofore.
Figure 15A:
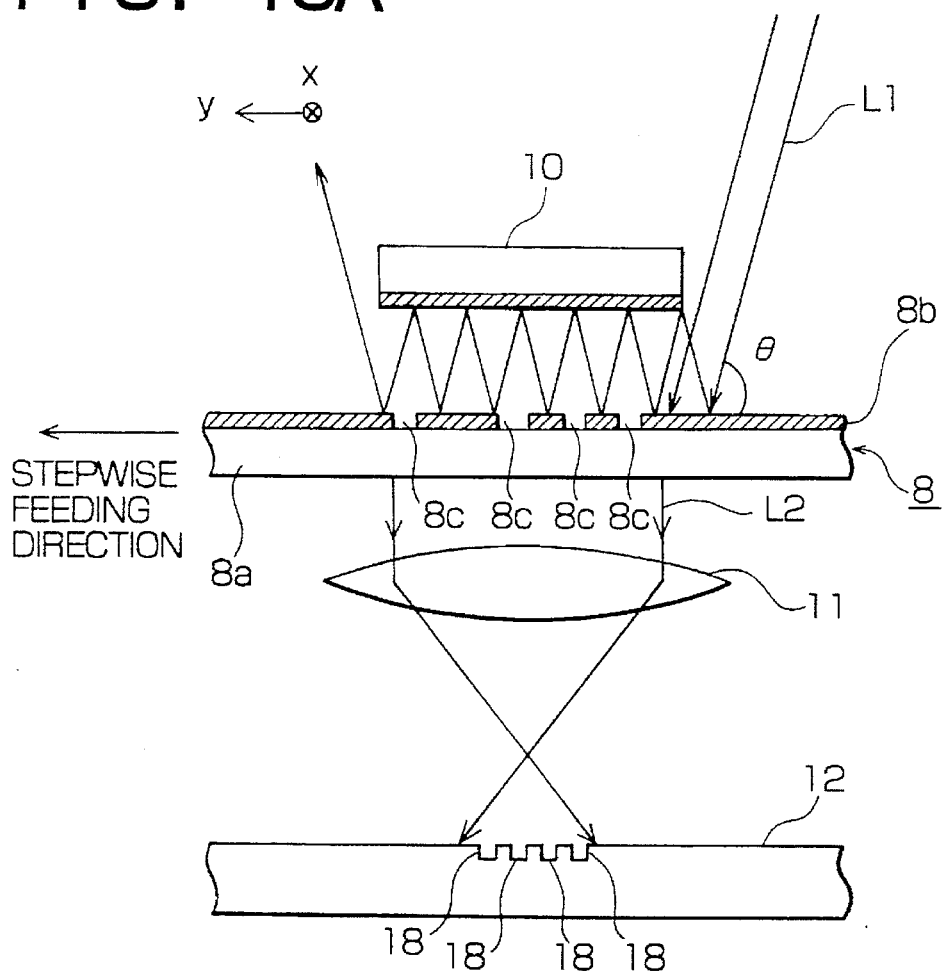
FIG. 15A is a side elevational view showing schematically and exaggeratedly a processing optical system including a patterning mask, a high reflectivity mirror, an imaging lens and a workpiece to be processed in the known apparatus.
Figure 15B:
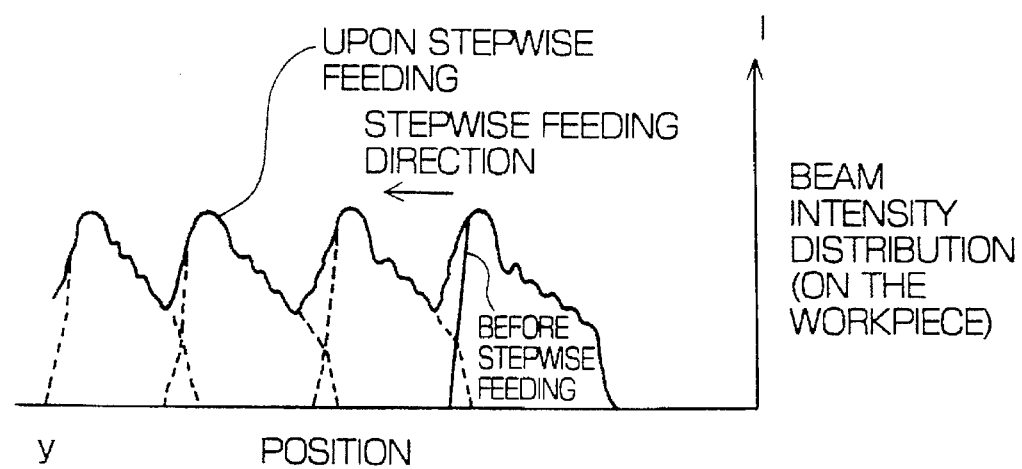
FIG. 15B is a view for graphically illustrating intensity distribution of an excimer laser beam on the workpiece as viewed in the y-direction in the known excimer laser beam irradiation apparatus.
Figure 16A:
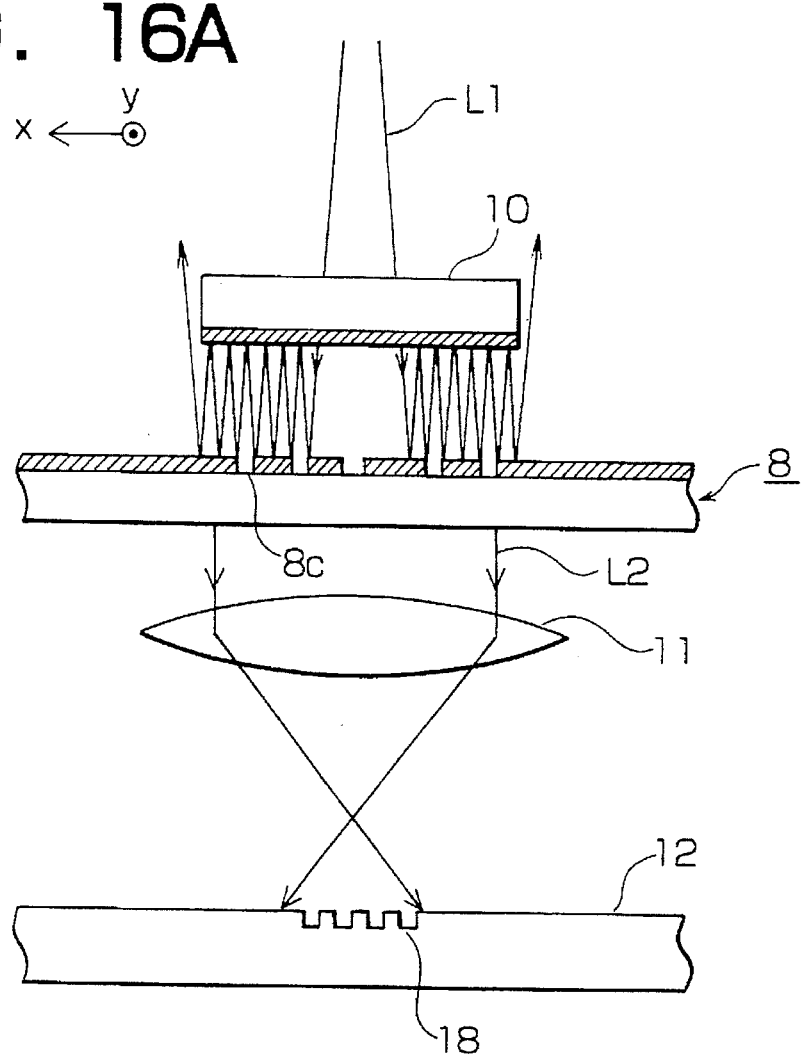
FIG. 16A is a side view showing schematically and exaggeratedly a processing optical system and associated part in the known excimer laser beam irradiation apparatus, as viewed in the y-axis direction.
Figure 16B:
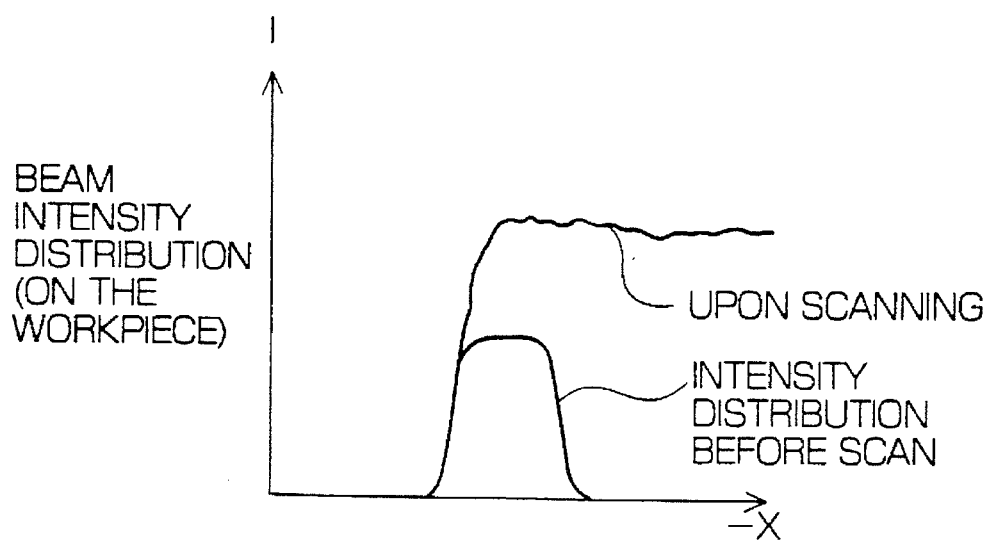
FIG. 16B is a view for graphically illustrating intensity distributions of the excimer laser beam on a workpiece in the x-axis direction.

Now, an excimer laser beam irradiation apparatus according to a first embodiment of the present invention will be described by reference to FIG. 1 which shows only schematically in a perspective view a general arrangement of the excimer laser beam irradiation apparatus. In this figure, reference characters L0, L1 and L2, 1 to 15 and 17 denote the parts or components which are like as or equivalent to those described hereinbefore by reference to FIG. 14. Accordingly, repeated description of these elements will be unnecessary.

Referring to FIG. 1, a control unit 16A is adapted to control the excimer laser oscillator 1 as well as the mask moving mechanism 9 and the workpiece moving mechanism 14 which are required to be driven with high accuracy in order to process a workpiece with high precision. Needless to say, the control unit 16A corresponds to the computerized control unit 16 described hereinbefore by reference to FIG. 14.

More specifically, for moving the patterning mask 8 and the workpiece 12 in synchronism with each other, the control unit 16A controls the scan moving direction (also referred to as the synchronous moving direction) so that it coincides with the direction in which the excimer laser beam L1 is shifted while undergoing concurrently multiple reflections (this direction will also be referred to as the reflectional shift direction). For convenience of the description, it is assumed that the scan moving direction or synchronous moving direction mentioned above coincides with the y-axis direction, while the stepwise feeding direction mentioned hereinbefore in conjunction with the conventional apparatus lies in the x-axis direction which is orthogonal to the y-axis direction.

Figure 2A:
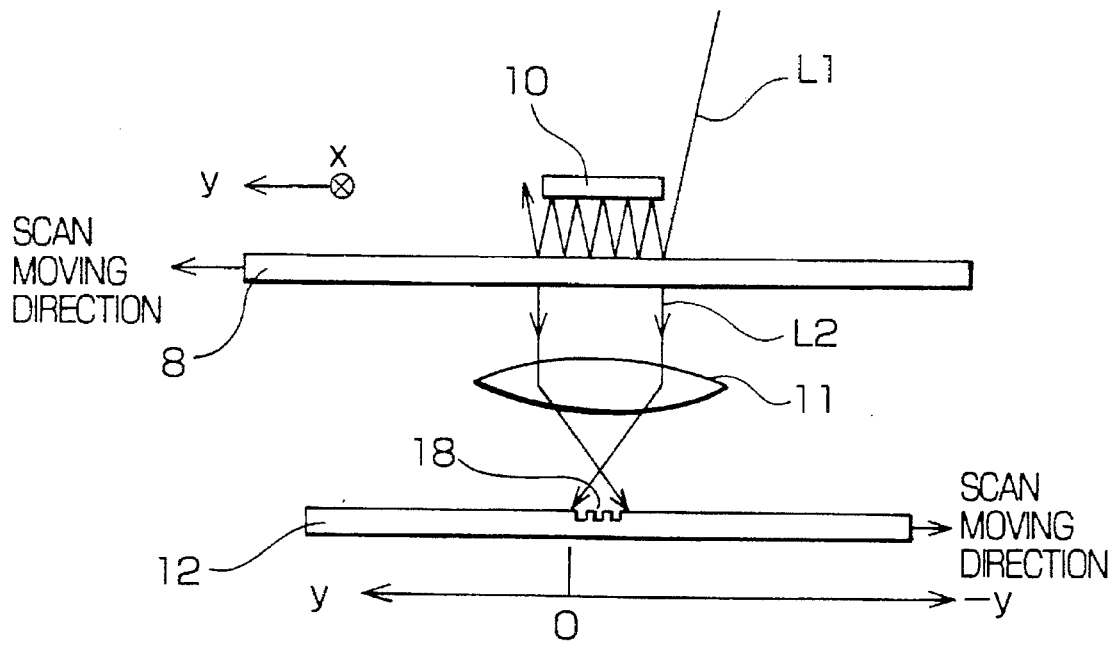
FIG. 2A is a side elevational view showing schematically and exaggeratedly an arrangement of a patterning mask, an imaging lens and a workpiece of the excimer laser beam irradiation apparatus as viewed in an x-axis direction.

FIG. 2A is a side elevational view showing an arrangement of the patterning mask 8, the imaging lens 11 and the workpiece 12 as viewed in the x-axis direction. In the figure, reference numeral 18 designates via-holes or the like formed in the workpiece 12 under radiation of the excimer laser L2. As can be seen in the figure, both the reflectional shift direction of the excimer laser beam L1 and the synchronous relative moving directions of the patterning mask 8 and the workpiece 12 are so selected as to coincide with the y-axis direction.

Figure 2B:
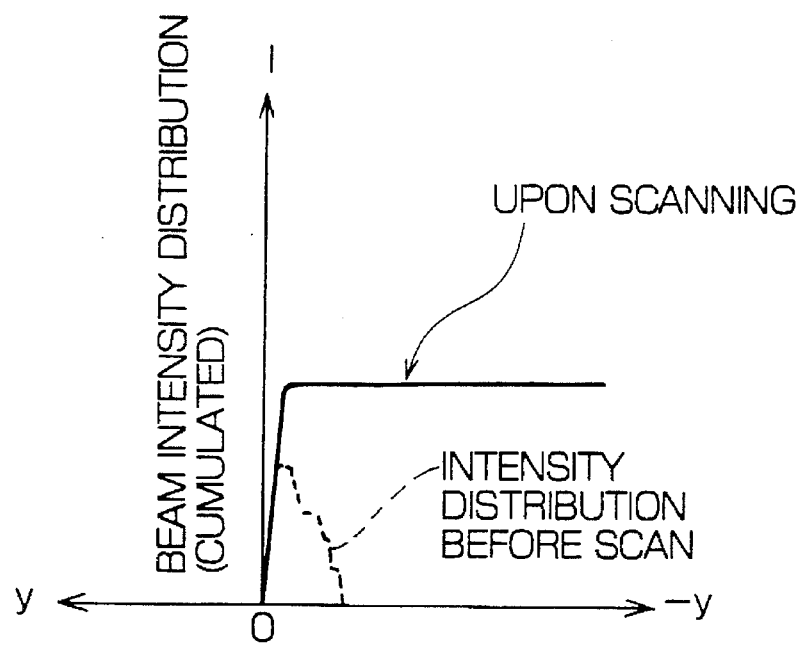
FIG. 2B is a view for illustrating an intensity distribution of an excimer laser beam impinging on a top surface of a workpiece as viewed along a y-axis direction orthogonally to the x-axis direction.

FIG. 2B is a view for illustrating an intensity distribution of the excimer laser beam L2 impinging on the top surface of the workpiece 12 as viewed along the y-axis direction.

Figure 3A:
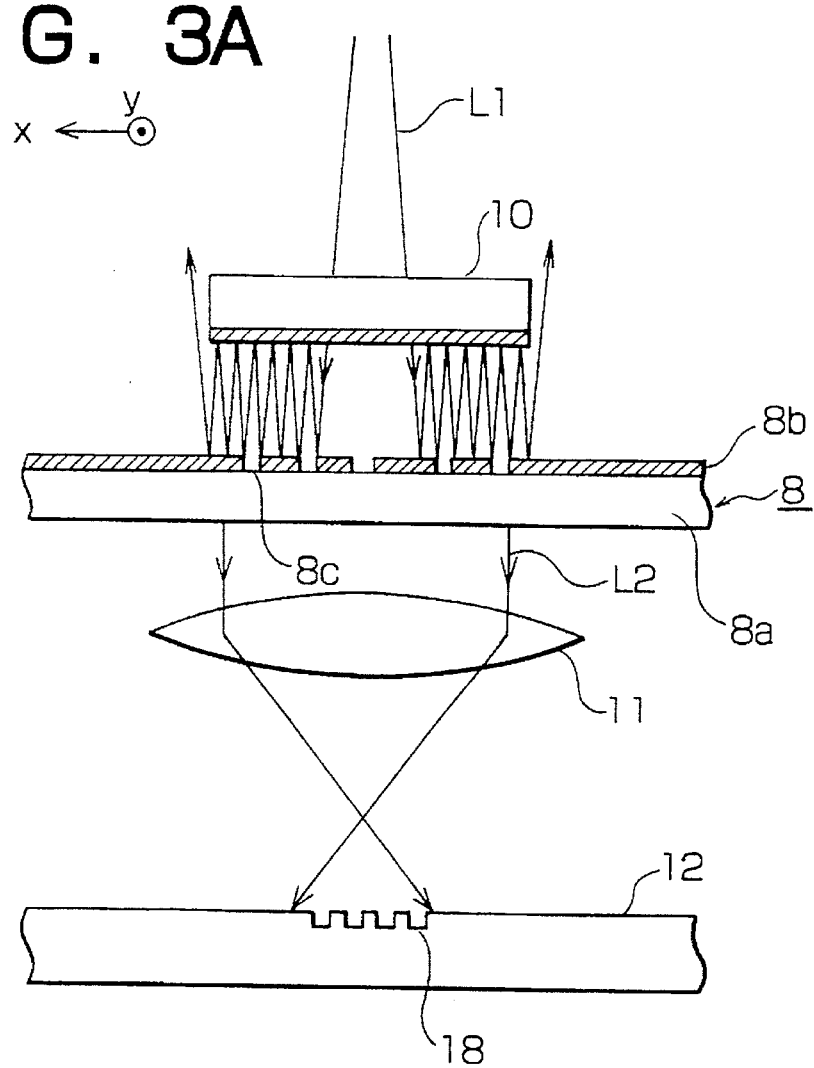
FIG. 3A is a side elevational view showing schematically and exaggeratedly the arrangement of the patterning mask, the imaging lens and the workpiece as viewed in the y-axis direction.
Figure 3B:
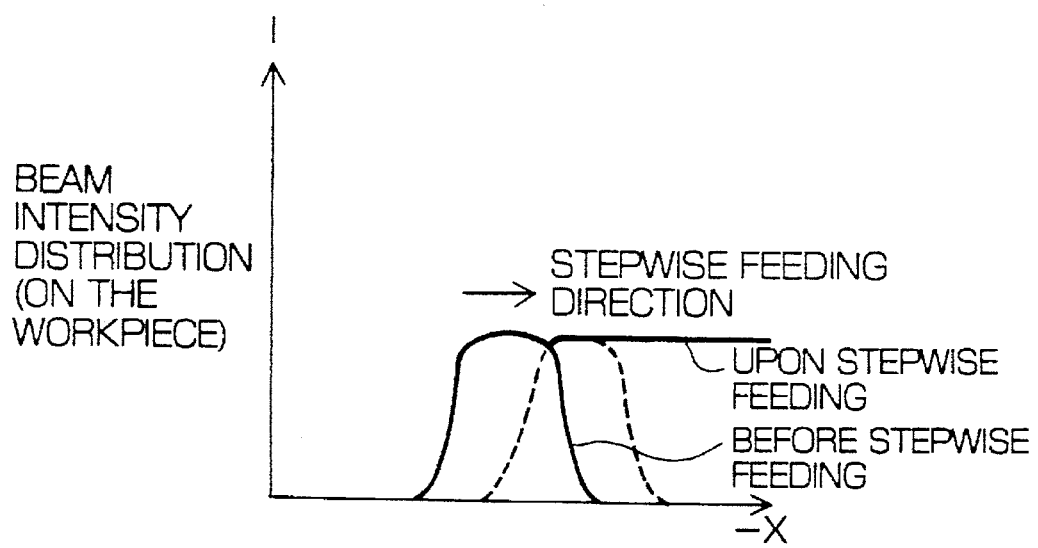
FIG. 3B is a view for graphically illustrating an intensity distribution of the excimer laser beam irradiating the workpiece, as viewed in the x-axis direction.

FIG. 3A is a side elevational view showing the arrangement of the patterning mask 8, the imaging lens 11 and the workpiece 12 as viewed in the y-axis direction, and FIG. 3B is a view for illustrating an intensity distribution of the excimer laser beam L2 irradiating the workpiece 12 as viewed along the x-axis direction.

Now, description will be directed to operation of the excimer laser beam irradiation apparatus according to the instant embodiment of the invention by reference to FIGS. 1 to 3.

Referring to FIG. 2A, a part of the excimer laser beam L1 incident on the patterning mask 8 at a top surface thereof obliquely from the above passes through the light passing holes 8c and the light-transmissive substrate 8a of the patterning mask 8 to thereby form the excimer laser beam L2 which partakes in working or processing the workpiece 12 in accordance with the pattern formed by the hollow holes 8c of the patterning mask 8 while the other part of the excimer laser beam L1 undergoes repetitively multiple reflections between the reflecting layer 8b of the patterning mask 8 and the high reflectivity mirror 10.

More specifically, the position at which the excimer laser beam L1 is reflected between the reflecting layer 8b of the patterning mask 8 and the high reflectivity mirror 10 is sequentially shifted in the y-axis direction (i.e., to the left-hand side as viewed in FIG. 2A). On the other hand, the excimer laser beam L2 passed through the light passing holes 8c of the patterning mask 8 and having a predetermined pattern corresponding to that of the patterning mask 8 impinges on the workpiece 12, whereby the via-holes 18 or the like are formed in the workpiece 12 under the etching action of the laser energy.

However, in actuality, the beam intensity of the excimer laser beam L1 becomes gradually lowered as the excimer laser beam L1 shifts in the y-axis direction (i.e., in the reflectional shift direction) from the incident side of the high reflectivity mirror 10 to the other side thereof while repeating the reflection between the reflecting layer 8b of the patterning mask 8 and the high reflectivity mirror 10 so long as the patterning mask 8 and the high reflectivity mirror 10 remain stationary. In other words, the intensity distribution of the excimer laser beam L2 on the workpiece 12 is such that the intensity of the excimer laser beam L2 impinging on the workpiece 12 becomes gradually feeble in the minus (−) y-axis direction when the patterning mask 8 and the high reflectivity mirror 10 are stationary, as can be seen from a broken line curve labeled "INTENSITY DISTRIBUTION BEFORE SCAN" (see FIG. 2B).

Accordingly, it is taught by the invention that the patterning mask 8 is moved in the y-axis direction with the workpiece 12 being moved in the y-axis direction in opposition relative to the patterning mask 8 (i.e., in the minus (−) y-axis direction) simultaneously with the displacement of the patterning mask 8 so that the workpiece 12 is scanned with the excimer laser beam L2 in appearance although the high reflectivity mirror 10 is held stationary. In that case, the excimer laser beam L2 exhibiting the intensity distribution characteristic such as indicated by the broken curve in FIG. 2B is caused to overlap continuously on the workpiece 12 in the y-axis direction, whereby a substantially uniform intensity distribution of the excimer laser beam is realized on the top surface of the workpiece 12 as indicated by a solid line curve labeled "UPON SCANNING" (see FIG. 2B). In this conjunction, the movements of the patterning mask 8 and the workpiece 12 for effecting the scanning of the excimer laser beam L2 in appearance, as mentioned above, will hereinafter be referred to as the scanning displacement with the direction thereof being referred to as the scan moving direction.

Thus, even when the intensity distribution of the excimer laser beam L2 is non-uniform in the y-axis direction before the scanning operation, as indicated by the broken line curve in FIG. 2B, the synchronous scanning displacement of the patterning mask 8 and the workpiece 12 as mentioned above causes the excimer laser beam L2 to overlap on the workpiece 12 in the y-axis direction, as a result of which the intensity distribution (the cumulated intensity level in more strict) of the excimer laser beam L2 can be made uniform, as indicated by the solid line curve in FIG. 2B.

By contrast, in x-axis direction, the intensity distribution of the excimer laser beam L2 is uniform as compared with the intensity distribution in the y-axis direction even when the patterning mask 8 and the workpiece 12 are in the stationary state (i.e., even when the patterning mask 8 and the workpiece 12 are not moved in the x-axis direction). Thus, the intensity distribution of the excimer laser beam L2 on the workpiece 12 can be maintained substantially uniformly regardless of the stepwise feeding of the patterning mask 8 in the x-axis direction and the stepwise feeding of the workpiece 12 in the opposite x-axis direction (i.e., in the minus (−) x-axis direction).

Embodiment 2

In the case of the excimer laser beam irradiation apparatus according to the first embodiment of the present invention described above, no consideration is paid to the starting position and the stop position of the patterning mask 8 in the synchronous scanning displacement thereof for scanning the workpiece 12 with the excimer laser beam 12 in appearance.

In this conjunction, it should however be noted that when the overall stroke or distance of the synchronous scanning displacement of the patterning mask 8 is made longer than a length of an effective pattern area on the patterning mask 8 (i.e., an area over which a hole or an aperture pattern is formed), the intensity distribution of the excimer laser beam L2 irradiating the workpiece 12 can be more uniformized.

With the second embodiment of the present invention, it is contemplated to set the distance or stroke of the synchronous scanning displacement of the patterning mask 8 to be greater than the length of the effective pattern area of the patterning mask 8. The excimer laser beam irradiation apparatus according to the instant embodiment of the invention will be described below by reference to FIG. 4. Parenthetically, the structure itself of the excimer laser beam irradiation apparatus is essentially same as that described hereinbefore by reference to FIG. 1.

According to the teaching of the invention incarnated in the instant embodiment, the overall distance for which the patterning mask 8 is moved synchronously with the workpiece 12 is so controlled by the control unit 16A as to be greater than the length of the effective pattern area of the patterning mask 8 as viewed in the scan moving direction. Additionally, the starting positions of the patterning mask 8 and the workpiece 12 for the scanning operation are so determined that a zone in which the moving speed of the patterning mask 8 during the synchronous scanning displacement is stabilized (this zone will hereinafter also be referred to as the stable scanning speed zone) covers a region on the workpiece 12 which is actually to be irradiated or illuminated with the excimer laser beam L2. This region of the workpiece 12 will also be referred to as the irradiated region.

Figure 4A:
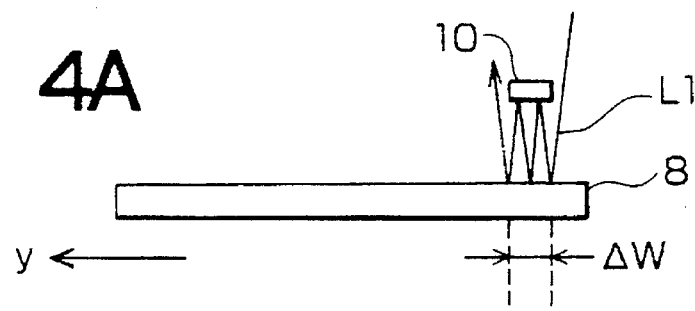
FIG. 4A is a side view showing a multiple reflection arrangement comprised of a patterning mask and a high reflectivity mirror in the excimer laser beam irradiation apparatus shown in FIG. 1.

FIG. 4A is a side elevational view showing a multiple reflection arrangement comprised of the patterning mask 8 and the high reflectivity mirror 10, as viewed in the x-axis direction, and illustrates schematically the state in which the excimer laser beam L1 undergoes multiple reflections while moving in the y-axis direction. As can be seen in FIG. 4A, the excimer laser beam L1 with which the patterning mask 8 is irradiated has a width ΔW in appearance or a reflection shift distance ΔW (i.e., length or distance for which the excimer laser beam L1 is shifted in the y-axis direction while undergoing the multiple reflections between the patterning mask 8 and the high reflectivity mirror 10 in the y-axis direction). On the other hand, FIG. 4B is a top plan view of the patterning mask 8, and FIG. 4C is a view for illustrating changes in a scan moving speed v as a function of the positions of the patterning mask 8 in the scan moving direction (in the minus (−) y-axis direction).

Figure 4B:
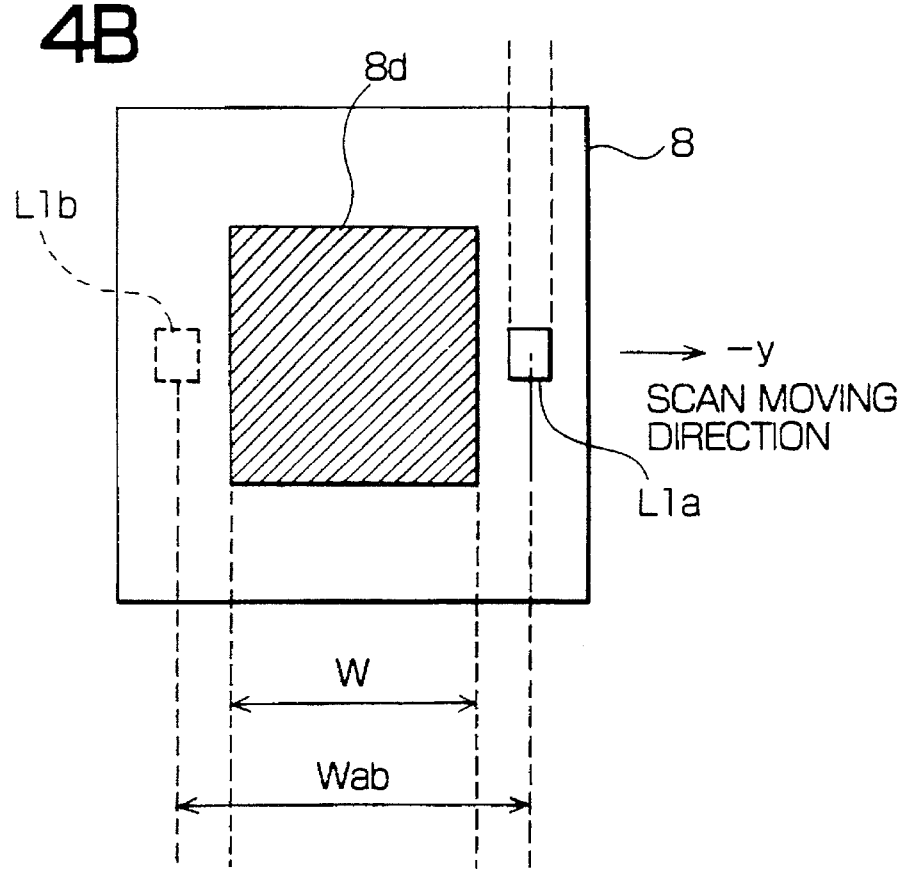
FIG. 4B is a top plan view of the patterning mask.
Figure 4C:
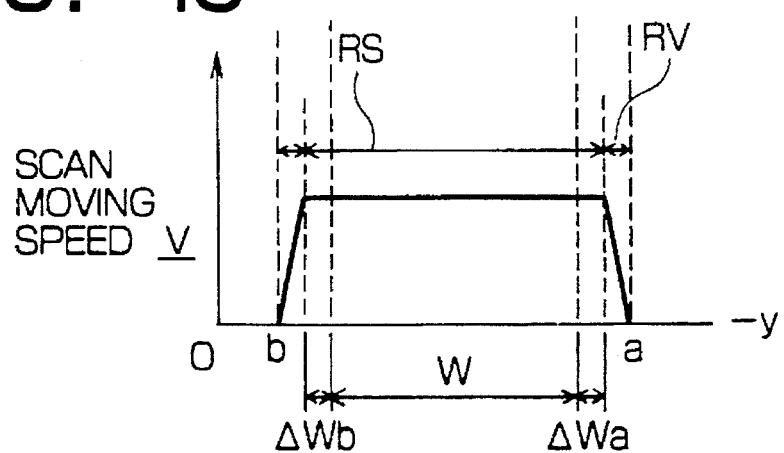
FIG. 4C is a view for graphically illustrating control of a scan moving speed as a function of positions on the patterning mask in the scan moving direction.

In FIG. 4, reference characters L1a and L1b designate regions on the patterning mask 8 irradiated with the excimer laser beam L (see FIG. 4B), reference characters a and b designates center positions of the irradiated regions L1a and L1b (see FIG. 4C), respectively, reference character Wab represents the distance of relative displacement of the excimer laser beam L1 for the scanning operation in the y-axis direction (see FIG. 4C), reference character 8d represents an effective pattern area on the patterning mask 8, W represents the width of the effective pattern area 8d (length in the y-axis direction), RS designates a stable speed region over which the scan moving speed v is stable, RV designates a speed variable region in which the scan moving speed v is variable, and ΔWa and ΔWb designate margin widths, respectively, of the speed stable region RS for the effective pattern area width W.

Now, it is assumed that the excimer laser beam L1 undergone the multiple reflections lies at the position L1a (the center position a in the y-axis direction), as indicated by a solid line rectangle in FIG. 4B. At that time, the control unit 16A (refer to FIG. 1) moves the patterning mask 8 in the minus (−) y-axis direction so that the excimer laser beam L1 moves from the solid line position L1a toward the broken line position L1b in the y-axis direction for effecting the scanning operation in appearance so that the excimer laser beam scans the patterning mask 8 in appearance along the y-axis direction from the position L1a to the position L1b.

In that case, the scan distance of the displacement Wab (i.e., the distance from the center position a to the position b) is selected to be greater than the length W of the area in which the imaging pattern is formed in the patterning mask 8, i.e., the effective pattern area 8d, as viewed in the synchronous moving direction (in y-axis direction) for the scanning operation.

Thus, the effective pattern area 8d covered by the excimer laser beam L1 during the synchronous scanning displacement from the position a to the position b lies within the speed stable region RS, as can be seen in FIGS. 4B and 4C, which in turn means that the intensity distribution (cumulated intensity level) of the excimer laser beam L1 irradiating the effective pattern area 8d is uniformized.

By the way, when the patterning mask 8 is moved in the minus (−) y-axis direction to thereby displace the center point of the excimer laser beam L1 undergoing the multiple reflections from the position a to b for effecting the scanning operation in appearance, the scan moving speed v changes, for example, in such a manner as illustrated in FIG. 4C. In that case, it will readily be understood that if the speed variable region RV of the scan moving speed v interferes with the effective pattern area 8d, the scan moving speed v changes within the effective pattern area 8d, as a result of which the intensity distribution (cumulated intensity value) of the excimer laser beam L1 irradiating the effective pattern area 8d may become non-uniform.

For the reasons mentioned above, the scanning displacement start position a and the scanning displacement stop position b are so set that the workpiece 12 can be processed within the speed stable region RS where the scan moving speed v of the patterning mask 8 is stable. In this way, the intensity distribution (cumulative intensity level) of the excimer laser beam L1 impinging onto the effective pattern area 8d can be much uniformized, whereby the workpiece 12 can be processed uniformly.

Parenthetically, relations between the reflection shift distance (width in appearance) ΔW of the excimer laser beam L1 and the margin (tolerance) widths ΔWa and ΔWb of the speed stable region RS may be selected so as to meet the conditions mentioned below:

$$\Delta Wa > \Delta W/2$$

$$\Delta Wb > \Delta W/2$$

As is obvious from the above expressions, each of the margin (tolerance) widths ΔWa and ΔWb has to be set greater than a half of the reflection shift distance (or width in appearance) ΔW of the excimer laser beam L1 in order that the effective pattern area 8d can be scanned within the effective pattern area 8d without fail. Incidentally, it should again be mentioned that the width ΔW in appearance of the excimer laser beam L1 corresponds to the distance for which the excimer laser beam L1 is shifted during the multiple reflections which the excimer laser beam L1 undergoes between the patterning mask 8 and the high reflectivity mirror 10.

Of course, it is the control unit 16A that determines the scanning displacement start/stop positions of the workpiece 12 which is moved in synchronism with the patterning mask 8, as described previously.

Embodiment 3

In the case of the excimer laser beam irradiation apparatus according to the second embodiment of the invention, the scan moving speed v during the synchronous scanning displacement of the patterning mask 8 and the workpiece 12 is maintained constant within the effective pattern area 8d. However, when the synchronous scan moving speed changes, it is desirable to control the oscillation repetition frequency of the excimer laser oscillator 1 as a function of the change in the scan moving speed to thereby uniformize the intensity distribution of the excimer laser beam L2 with which the workpiece 12 is irradiated by scanning with the excimer laser beam L2 in appearance.

With the teaching of the invention incarnated in the third embodiment, it is contemplated to control the oscillation repetition frequency of the excimer laser oscillator 1 in dependence on the change in the scan moving speed v. An excimer laser beam irradiation apparatus according to the third embodiment of the invention will now be described by reference to FIGS. 5 and 6, of which FIG. 5 is a perspective view showing schematically a structure of the excimer laser beam irradiation apparatus according to the instant embodiment of the invention, wherein reference characters L0, L1 and L2, 1 to 15 and 17 designate parts or components same as or equivalent to those denoted by like reference characters in the description of the first and second embodiments of the invention.

The mask moving mechanism 9 and the workpiece moving mechanism 14 are driven with high accuracy under the control of a control unit 16B which constitutes the control means and which corresponds to the control unit 16A shown in FIG. 1. A speed measuring unit 19 is provided for measuring the scan moving speed v of the patterning mask 8 and the workpiece 12. In this conjunction, it should again be mentioned that the patterning mask 8 and the workpiece 12 are moved in the opposite directions along the y-axis in synchronism with each other. Accordingly, in the description which follows, only the scan moving speed v of the patterning mask 8 is taken into consideration, being understood that the following description holds true for the scan moving speed of the workpiece 12. The scan moving speed v measured by the speed measuring unit 19 is inputted to the control unit 16B to be used for controlling the oscillation repetition frequency f of the excimer laser oscillator 1 in dependence on the scan moving speed v.

Figure 5:
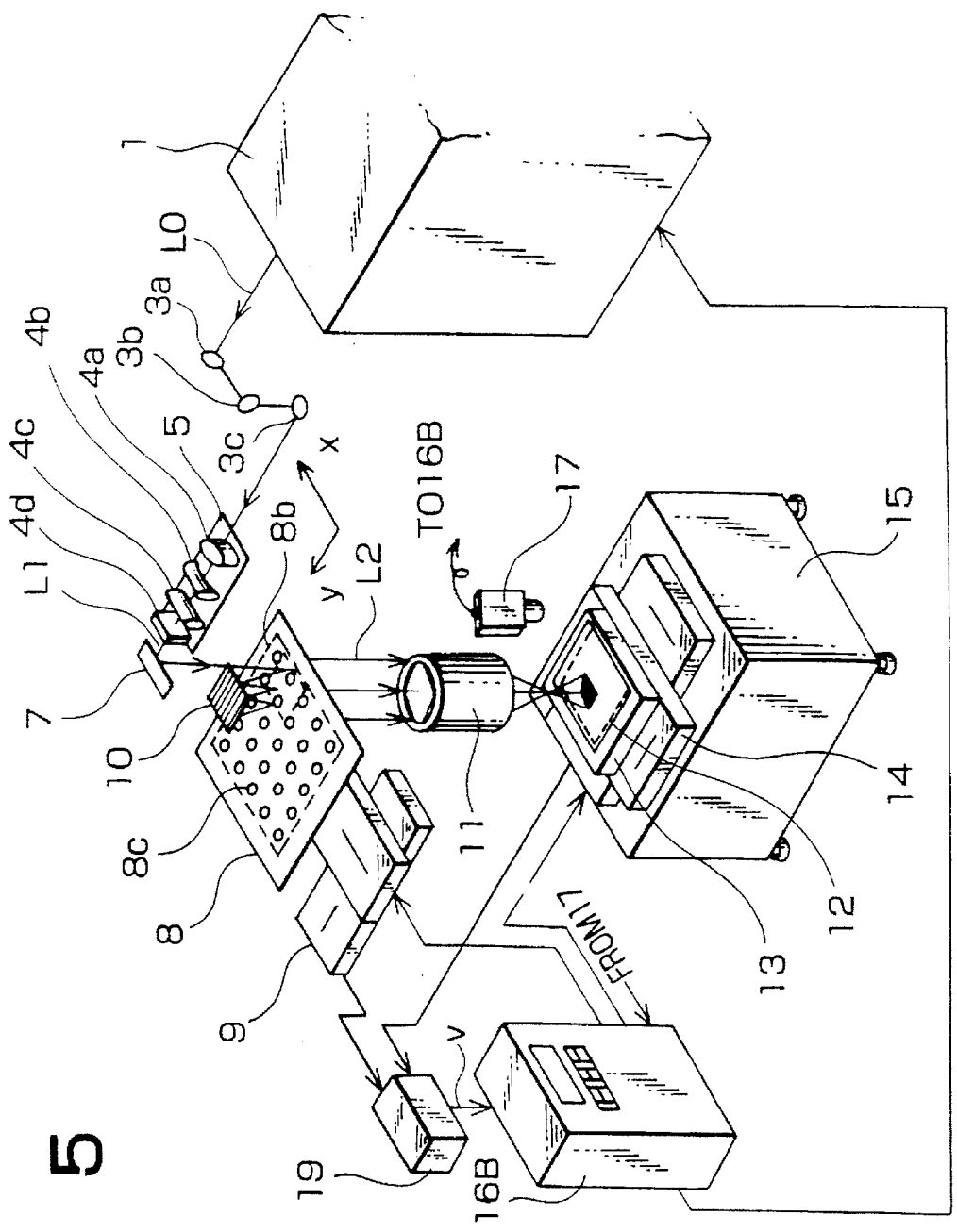
FIG. 5 is a perspective view showing an excimer laser beam irradiation apparatus according to another embodiment of the present invention.

The control unit 16B shown in FIG. 5 is so designed or programmed that when the scan moving speed v of the patterning mask 8 changes or varies during the scanning displacement thereof synchronously with the workpiece 12 within a processed pattern area of the workpiece 12 (i.e., the area of the workpiece 12 to be processed with the irradiation of the excimer laser beam L2) which corresponds to the effective pattern area 8d of the patterning mask 8 mentioned hereinbefore (see FIG. 4B), the oscillation repetition frequency f of the excimer laser oscillator 1 is decreased below a predetermined frequency $f_0$ when the scan moving speed v is lower than a predetermined speed $v_0$, whereas when the scan moving speed v is higher than the predetermined speed $v_0$, the oscillation repetition frequency f is increased beyond the predetermined frequency $f_0$.

Figure 6A:
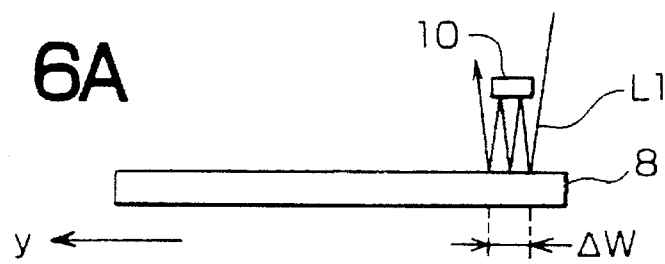
FIG. 6A is a side view for illustrating schematically a state in which an excimer laser beam undergoes multiple reflections between a patterning mask and a high reflectivity mirror while shifting in the y-axis direction.
Figure 6B:
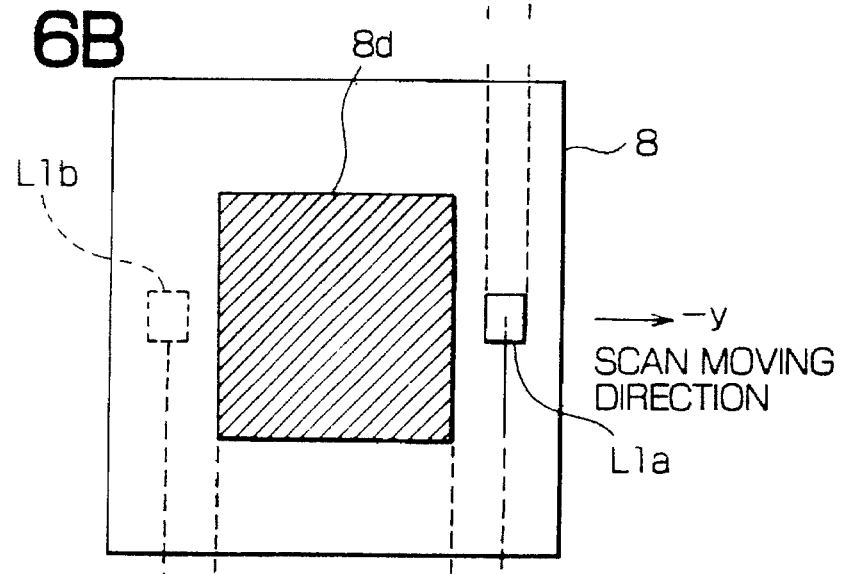
FIG. 6B is a top plan view of the patterning mask.
Figure 6C:
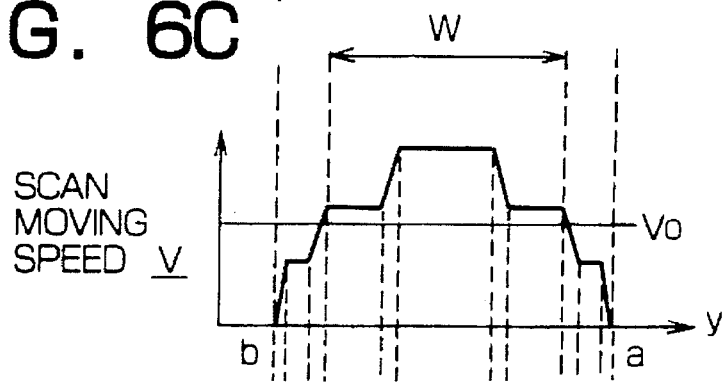
FIG. 6C is a view for graphically illustrating variations in the scan moving speed of the patterning mask during a synchronous scanning displacement in the y-axis direction.
Figure 6D:
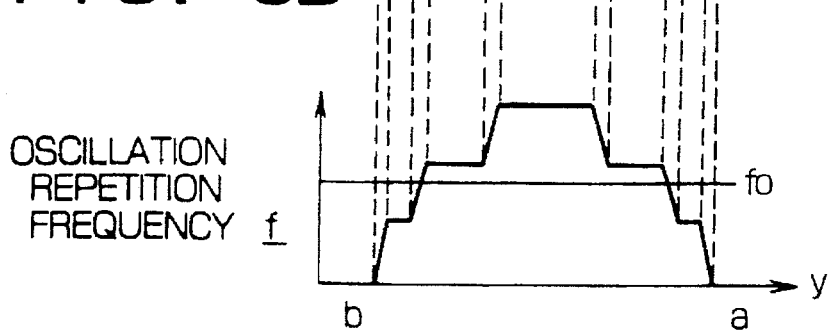
FIG. 6D is a view for graphically illustrating control of an oscillation repetition frequency of an excimer laser oscillator in dependence on the change of the scan moving speed during the synchronous scanning displacement.

FIG. 6A is a side view showing a multiple reflection arrangement for the excimer laser beam L1, as viewed in the x-axis direction, and illustrates schematically the state in which the excimer laser beam L1 undergoes multiple reflections between the patterning mask 8 and the high reflectivity mirror 10 while moving in the y-axis direction. FIG. 6B is a top plan view of the patterning mask 8, wherein reference characters 8d, L1a and L1b have the same meanings mentioned hereinbefore in conjunction with the second embodiment (see FIG. 4). FIG. 6C is a view for illustrating changes in the scan moving speed v of the patterning mask 8 during the synchronous scanning displacement in the y-axis direction, by way of example only. Further, FIG. 6D is a view for illustrating change in the oscillation repetition frequency f of the excimer laser oscillator 1 during the synchronous scanning displacement, only by way of example.

Now, description will be directed to operation of the excimer laser beam irradiation apparatus according to the instant embodiment of the invention by reference to FIGS. 5 and 6.

It is assumed that the excimer laser beam L1 undergone the multiple reflections lies at the position L1a indicated by a solid line rectangle in FIG. 6B. At that time, the control unit 16B moves the patterning mask 8 in the minus (−) y-axis direction so that the center point of the excimer laser beam L1 moves from the position a toward the position b for effecting a scanning operation in appearance in order to make uniform the intensity distribution (cumulated intensity level) of the excimer laser beam in the y-axis direction.

In this conjunction, it is assumed that the scan moving speed v changes during the synchronous scanning displacement in such a manner as illustrated in FIG. 6C. Consequently, the intensity (cumulated intensity level) of the excimer laser beam L2 projected onto the workpiece 12 after passing through the effective pattern area 8d of the patterning mask 8 becomes high when the scan moving speed v is low while the intensity becomes low when the scan moving speed v is high on the assumption that the oscillation repetition frequency f is set at a predetermined constant frequency $f_0$, whereby adverse influence will be exerted to the processing susceptibility of the workpiece 12.

Such being the circumstances, the control unit 16B monitors the scan moving speed v during the synchronous scanning displacement of the patterning mask 8 with the aid of the speed measuring unit 19 and controls the oscillation repetition frequency f of the excimer laser oscillator 1 in dependence on the scan moving speed v as measured or detected in such a manner as illustrated in FIG. 6D. More specifically, when the scan moving speed v is higher than the predetermined speed $v_0$, the oscillation repetition frequency f is set higher than the predetermined frequency $f_0$, whereas the oscillation repetition frequency f is set lower than the predetermined frequency $f_0$ when the scan moving speed v is lower than the predetermined speed $v_0$.

In this way, the intensity distribution (cumulated intensity level) of the excimer laser beam L2 projected onto the workpiece 12 can be uniformized. In this conjunction, relation between the scan moving speed v and the oscillation repetition frequency f of the excimer laser oscillator 1 may be given by the following expressions.

$$f = f_0 + k1 \cdot \Delta v$$

$$\Delta v = v - v_0$$

where k1 represents a proportional constant of a positive (+) value, and $\Delta v$ represents a deviation or difference between the scan moving speed v and the predetermined speed $v_0$.

The predetermined frequency $f_0$ and the predetermined speed $v_0$ used as the references or standards for the scan moving speed v and the oscillation repetition frequency f correspond, respectively, to the oscillation repetition frequency f and the scan moving speed v at which the workpiece can be processed stably in the normal stage. In other words, by setting the scan moving speed v to $v_0$ with the oscillation repetition frequency being set to $f_0$, the workpiece 12 can be processed stably.

In the excimer laser beam irradiation apparatus according to the instant embodiment of the invention, the intensity distribution of the excimer laser beam can essentially be maintained constant by increasing or decreasing the oscillation repetition frequency f in dependence on the scan moving speed v, as can be seen in FIG. 6D. Thus, the intensity distribution (cumulated intensity level) of the excimer laser beam L1 with which the effective pattern area 8d of the patterning mask 8 is irradiated can be uniformized, which in turn means that the workpiece 12 can be processed uniformly.

Embodiment 4

In the case of the excimer laser beam irradiation apparatuses according to the preceding embodiments, no consideration is paid to variations in the thickness, material and other factors of the workpiece 12. It is however preferable to uniformize the effective intensity distribution of the excimer laser beam L2 projected onto the workpiece 12 by increasing or decreasing the oscillation repetition frequency f or the scan moving speed v in dependence on variations in the thickness, material and/or other factor when such variation(s) occurs.

With the teaching of the present invention incarnated in the fourth embodiment, it is contemplated to control the oscillation repetition frequency f of the excimer laser oscillator 1 or the scan moving speed v in dependence on variations in the thickness and the material of the workpiece 12. An excimer laser beam irradiation apparatus according to the fourth embodiment of the invention will be described by reference to FIGS. 7 and 9, of which FIG. 7 is perspective view showing the excimer laser beam irradiation apparatus according to the instant embodiment of the invention, wherein reference characters L0, L1 and L2, 1 to 15 and 17 designate parts or components same as or equivalent to those denoted by like reference characters in the description of the preceding embodiments of the invention.

The mask moving mechanism 9 and the workpiece moving mechanism 14 are driven with high accuracy under the control of a control unit 16C which constitutes the control means and which corresponds to the control unit 16A shown in FIG. 1. A thickness deviation sensor 20 is provided for measuring variations in the thickness d of the workpiece 12. The thickness d measured by the thickness deviation sensor 20 is inputted to the control unit 16C.

Figure 7:
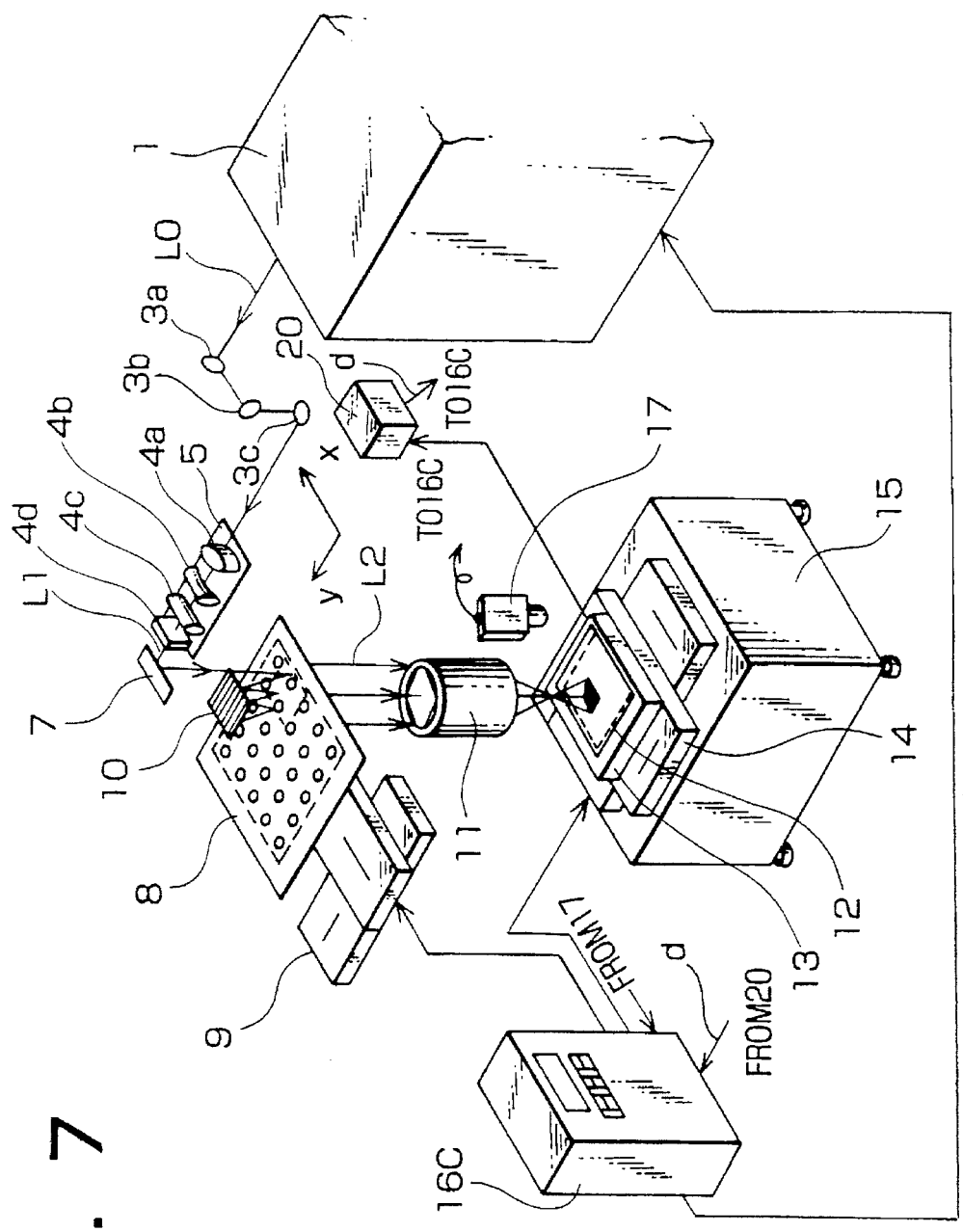
FIG. 7 is a perspective view showing schematically a structure of an excimer laser beam irradiation apparatus according to the yet another embodiment of the present invention.

The control unit 16C shown in FIG. 7 is designed or programmed such that when the thickness d of the workpiece 12 is greater than a predetermined thickness $d_0$, the oscillation repetition frequency f of the excimer laser oscillator 1 is increased beyond a predetermined frequency $f_0$ whereas the oscillation repetition frequency f is decreased below the predetermined frequency $f_0$ when the thickness d is smaller than the predetermined thickness $d_0$.

Alternatively, the control unit 16C shown in FIG. 7 may be designed or programmed such that when the thickness d of the workpiece 12 is greater than the predetermined thickness $d_0$, the scan moving speed v of the workpiece 12 (as well as that of the patterning mask 8) is decreased below the predetermined speed $v_0$, whereas the scan moving speed v of the workpiece 12 (as well as that of the patterning mask 8) is increased beyond the predetermined speed $v_0$ when the thickness d is smaller than a predetermined thickness $d_0$. For convenience of the description, the scan moving speed v of the workpiece 12 is considered, being understood that the scan moving speed v of the workpiece 12 corresponds to that of the patterning mask 8 although they do not coincide with each other in the strict sense.

Figure 8A:
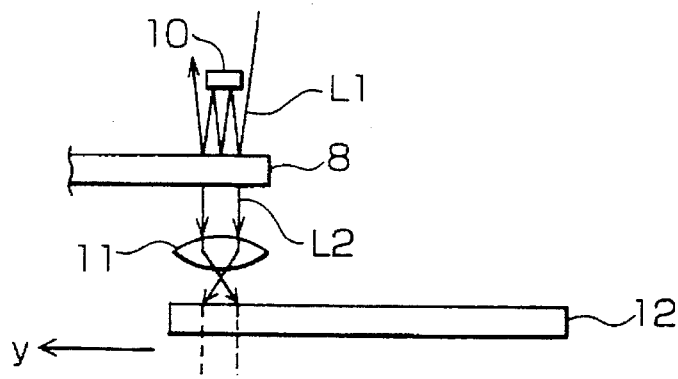
FIG. 8A is a side View showing a multiple reflection arrangement of a patterning mask, a high reflectivity mirror and a workpiece in the excimer laser beam irradiation apparatus shown in FIG. 7, as viewed in the x-axis direction.
Figure 8B:
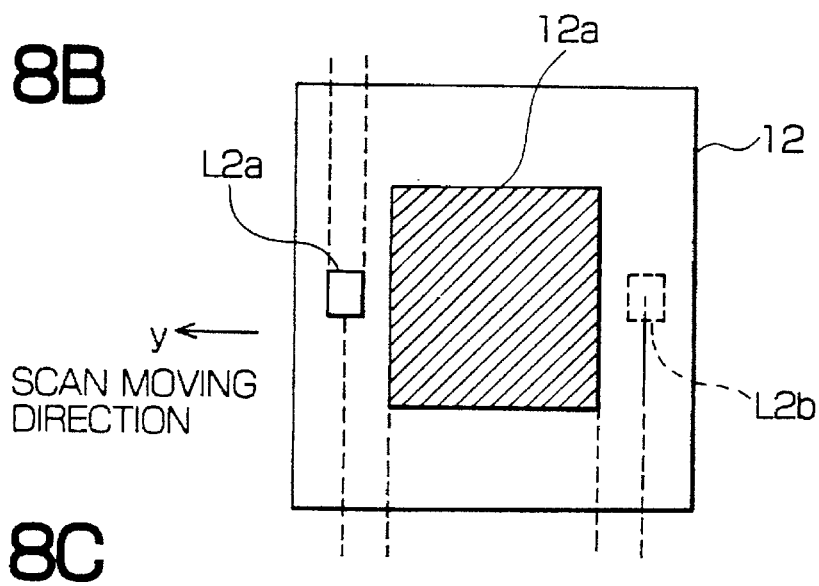
FIG. 8B is a top plan view illustrating schematically an area of a workpiece to be irradiated with an excimer laser beam projected by an imaging lens after passing through the patterning mask.

FIG. 8A is a side view showing multiple reflection arrangements of the patterning mask 8 and the high reflectivity mirror 10 together with the imaging lens 11 and a workpiece 12, as viewed in the x-axis direction, and FIG. 8B is a plan view for illustrating schematically an area to be irradiated with the excimer laser beam L2 projected onto the workpiece 12 by the imaging lens 11 after passing through the patterning mask 8.

Referring to FIG. 8B, there are shown an irradiated area (effective processed area) 12a formed on the workpiece 12 by imaging the effective pattern area 8d of the patterning mask 8 thereon, an area L2a on the workpiece 12 illuminated with the excimer laser beam L2 before the synchronous scanning displacement of the workpiece 12 and a position L2b on the workpiece 12 illuminated with the excimer laser beam L2 after the synchronous displacement of the workpiece 12.

Figure 8C:
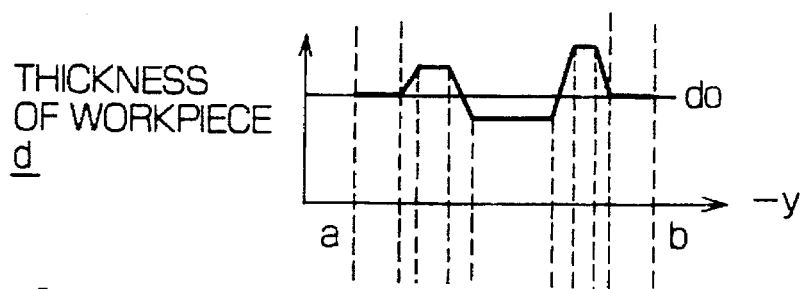
FIG. 8C is a view for graphically illustrating variations in a thickness of the workpiece as viewed along the scan moving direction.

FIG. 8C is a view for illustrating variation in the thickness d of the workpiece 12 as viewed in the scan moving direction (i.e., in the y-axis direction) thereof, wherein a reference character $d_0$ designates a predetermined thickness serving as a reference or standard thickness and reference characters a and b denote center positions of the excimer laser beam L2 at the start and the end of the synchronous scanning displacement, respectively.

Figure 8D:
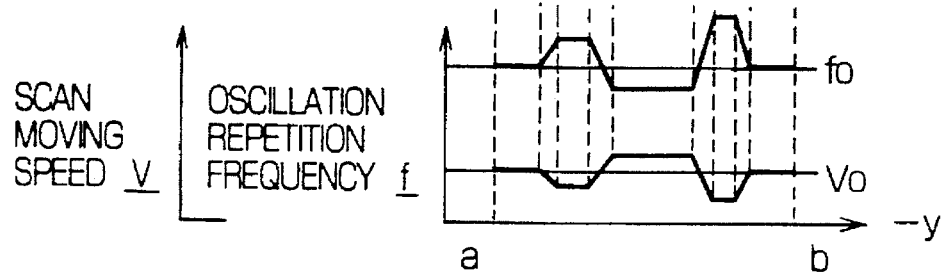
FIG. 8D is a view for graphically illustrating control of a scan moving speed or a laser oscillation frequency in dependence on variations in the thickness of the workpiece.

FIG. 8D is a view for illustrating the oscillation repetition frequency f or the scan moving speed v controlled in dependence on variations in the thickness d of the workpiece 12, wherein a reference character $f_0$ represents a predetermined frequency serving as a standard for comparison. Further, reference character $v_0$ represents a standard for comparison with the scan moving speed v of the patterning mask 8.

Now, it is assumed that the center point of the excimer laser beam L1 undergone the multiple reflections and projected through the patterning mask 8 and the imaging lens 11 lies at a position a on the y-axis (see FIGS. 4C and 4D). Starting from this position, the workpiece 12 is moved in the y-axis direction in synchronism with the scanning displacement of the patterning mask 8 so that the excimer laser beam L1 moves in appearance from the position a to the position b for effecting scanning operation in order to make uniform the intensity distribution (cumulated intensity level) of the excimer laser beam in the y-axis direction nevertheless of the multiple reflections, as elucidated hereinbefore.

In that case, when the thickness d of the workpiece 12 changes in such a manner as illustrated in FIG. 8C within the irradiated area 12a on the workpiece 12 over which the effective pattern area 8d of the patterning mask 8 is projected (see FIG. 6B), it is then required to change correspondingly the amount of irradiation of the excimer laser beam L2 in dependence on the thickness d of the workpiece 12 in order to process effectively uniformly the workpiece 12.

By way of example, when the thickness d of the workpiece 12 becomes greater than the predetermined thickness $d_0$, the amount of irradiation of the excimer laser beam L2 has to be increased, whereas when the thickness d becomes smaller than the predetermined thickness $d_0$, the amount of irradiation of the excimer laser beam L2 must be decreased.

To this end, the control unit 16C monitors variation in the thickness d of the workpiece 12 with the aid of the deviation sensor 20. Alternatively, the thickness d of the workpiece 12 may be measured in dependence. The oscillation repetition frequency f of the excimer laser oscillator 1 or the scan moving speed v during the synchronous scanning displacement is variably controlled by the control unit 16C in dependence on the thickness d of the workpiece 12 in such a manner as illustrated in FIG. 8D.

In this conjunction, let's assume that the oscillation repetition frequency f is to be controlled in dependence on the thickness d of the workpiece 12 by means of the control unit 16C. In that case, relations mentioned below apply valid to the thickness d and the oscillation repetition frequency f of the excimer laser oscillator 1.

$$f = f_0 + k2 \cdot \Delta d$$

$$\Delta d = d - d_0$$

where k2 represents a proportional constant of a positive (+) value, and $\Delta d$ represents a deviation or difference between the thickness d of the workpiece 12 and the predetermined thickness $d_0$. The predetermined frequency $f_0$ and the predetermined thickness $d_0$ represent the standard values for the oscillation repetition frequency f and the thickness d, respectively, which are required for processing stably the workpiece 12 which is assumed to have a predetermined uniform thickness, wherein the standard or reference values $d_0$ and the predetermined frequency $f_0$ are so selected that the workpiece 12 can be processed stably by irradiating the workpiece 12 with the excimer laser beam L2 of the predetermined frequency $f_0$ when the workpiece 12 is moved at a constant speed during the synchronous scanning displacement.

On the other hand, in the case where the scan moving speed v is to be controlled by the control unit 16C, relation given by the following expression applies valid.

$$v = v_0 - k3 \cdot \Delta d$$

where k3 represents a proportional constant. In this case, the scan moving speed v is controlled in inverse proportional relation to the deviation $\Delta d$ in the thickness d.

The predetermined speed $v_0$ and the predetermined thickness $d_0$ represent respective standard values for allowing the workpiece 12 to be processed stably, and thus they are so selected that when the workpiece 12 of the predetermined uniform thickness $d_0$ is irradiated with the excimer laser beam L2 of a predetermined constant oscillation repetition frequency, the workpiece 12 can be processed stably and uniformly by moving the workpiece 12 at the standard speed $v_0$ during the synchronous scanning displacement.

By controlling variably the oscillation repetition frequency f or the scan moving speed v in dependence on the thickness d of the workpiece 12, it is possible to process effectively uniformly the workpiece 12 with the irradiation of the excimer laser beam L2 even when the thickness d of the workpiece 12 varies, as can be seen in FIGS. 8C and 8D.

Next, referring to FIG. 9, description will turn to the control of the oscillation repetition frequency f or the scan moving speed v in dependence on the material of the workpiece 12.

In this case, the control unit 16C arithmetically determines an etching rate e for a single shot of pulse of the excimer laser beam L2 on the basis of the thickness d measured by the deviation sensor 20 to thereby decide on the basis of a deviation be from a predetermined etching rate $e_0$ whether the material of the workpiece 12 is easy or difficult to process.

More specifically, when the material of the workpiece 12 changes within the area 12a of the workpiece 12 irradiated with the excimer laser beam L2 during the synchronous scanning displacement, the oscillation repetition frequency f of the excimer laser oscillator 1 is decreased below the predetermined frequency $f_0$ by the control unit 16C when it is decided that the material of the workpiece 12 is relatively easy to process, whereas the oscillation repetition frequency f is increased beyond the predetermined frequency $f_0$ when the material of the workpiece 12 is relatively difficult to process.

As the alternative, the scan moving speed v of the workpiece 12 (and that of the patterning mask 8) may be increased beyond the predetermined speed $v_0$ under the control of the control unit 16C, when the material of the workpiece 12 is relatively easy to process, whereas the scan moving speed v is decreased below the predetermined speed $v_0$ when the material of the workpiece 12 is relatively difficult to process.

Figure 9A:
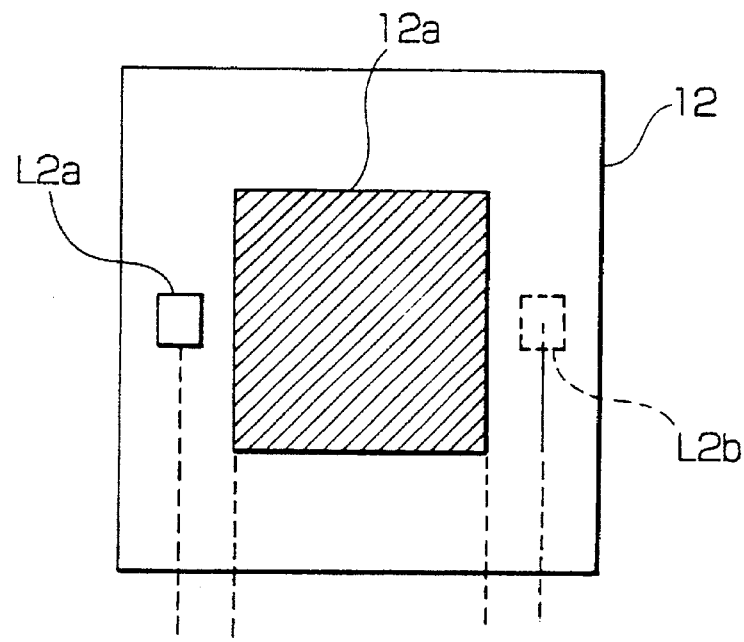
FIG. 9A is a top plan view for illustrating schematically positions which an excimer laser beam assumes on the workpiece.
Figure 9B:
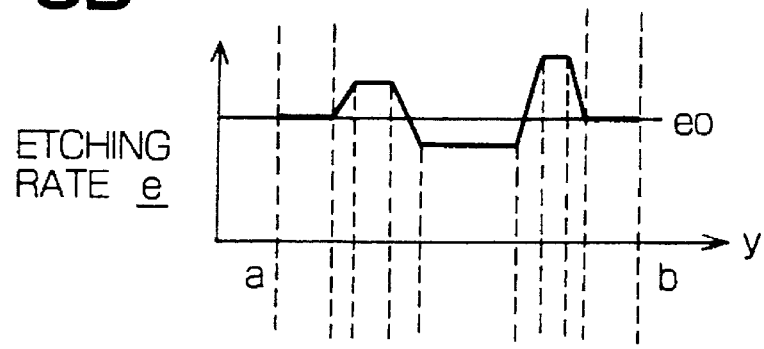
FIG. 9B is a view for illustrating changes in an etching rate of an excimer laser beam as viewed in a scan moving direction.
Figure 9C:
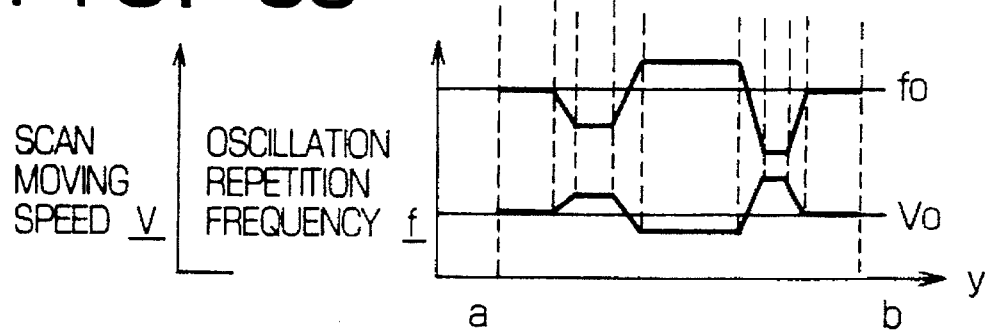
FIG. 9C is a view for graphically illustrating control of an oscillation repetition frequency or a scan moving speed in dependence on changes in the etching rate of the excimer laser beam.

FIG. 9A is a top plan view for illustrating schematically positions which the excimer laser beam L2 assumes and an irradiated region on the workpiece 12, FIG. 9B is a view for illustrating changes in the etching rate e as viewed in the scan moving direction (y-axis direction) of the workpiece 12, and FIG. 9C is a view for illustrating the control of the oscillation repetition frequency f and the scan moving speed v in dependence on the etching rate e. In the figure, reference character $e_0$ represents a reference or standard rate for comparison with the etching rate e.

When the material of the workpiece 12 changes within the irradiated area 12a, as illustrated exemplarily in FIG. 9B, the control unit 16C arithmetically determines in precedence the etching rate e corresponding or comparable to the material of the workpiece 12 on the basis of the thickness d measured by the thickness 20. Parenthetically, the etching rate e can be determined on the basis of the depth of the via-hole (see FIG. 3) formed in the workpiece 12 with irradiation by a single shot of pulse of the excimer laser beam L2.

In dependence on the etching rate e determined in this way, the control unit 16C controls variably the oscillation repetition frequency f of the excimer laser oscillator 1 or alternatively the moving speed v of the workpiece 12 during the scanning displacement in such a manner as illustrated, by way of example, in FIG. 9C.

More specifically, when the etching rate e is lower than the predetermined etching rate $e_0$, indicating that the workpiece 12 is made of a material which is relatively difficult to process, the control unit 16C increases the oscillation repetition frequency f beyond the predetermined frequency $f_0$ or alternatively lowers the scan moving speed v.

On the other hand, when it is decided that the etching rate e is higher than the predetermined etching rate $e_0$, meaning that the material of-the workpiece 12 is easy to process in the relative sense, the control unit 16C decreases the oscillation repetition frequency f below the predetermined frequency $f_0$ or alternatively increases the scan moving speed v beyond the predetermined speed $v_0$.

In the case where the oscillation repetition frequency f is to be controlled by the control unit 16C, relations given by the following expression apply valid for the etching rate e indicating whether the material of the workpiece 12 is easy or difficult to process and the oscillation repetition frequency f of the excimer laser oscillator 1.

$$f = f_0 + k4 \cdot \Delta e$$

$$\Delta e = e - e_0$$

where k4 represents a proportional constant of a positive (+) value, and $\Delta e$ represents a deviation or difference of the etching rate e of the workpiece 12 from the predetermined etching rate $e_0$.

The predetermined frequency $f_0$ and the predetermined etching rate $e_0$ represent the standard values for the oscillation repetition frequency f and the thickness d, respectively, which are required for processing stably and uniformly the workpiece 12, wherein the standard or reference values $e_0$ and the predetermined frequency $f_0$ are so selected that the workpiece 12 can be processed stably by irradiating the workpiece 12 with the excimer laser beam L2 of the predetermined frequency $f_0$ when the workpiece 12 is moved at a constant speed during the synchronous scanning displacement.

On the other hand, in the case where the scan moving speed v is to be controlled by the control unit 16C, relation given by the following expression applies valid for the etching rate e and the scan moving speed v during the synchronous scanning displacement.

$$v = v_0 - k5 \cdot \Delta e$$

where k5 represents a proportional constant.

The predetermined speed $v_0$ and the predetermined etching rate $e_0$ represent respective standard values for allowing the workpiece 12 to be processed stably and uniformly, and thus they are so selected that when the workpiece 12 of the material corresponding to the predetermined etching rate $e_0$ is irradiated with the excimer laser beam L2 of a predetermined constant oscillation repetition frequency, the workpiece 12 can be processed stably and uniformly by moving the workpiece 12 at the standard speed $v_0$ during the synchronous scanning displacement.

By controlling the oscillation repetition frequency f or the scan moving speed v in dependence on the etching rate e in such a manner as illustrated in FIG. 9C, there can be realized irradiation intensity of the excimer laser beam L2 over the irradiated area 12a on the workpiece 12 which allows the processing to be performed effectively uniformly even when the material of the workpiece 12 changes within the irradiated area 12a.

Embodiment 5

In the excimer laser beam irradiation apparatuses according to the preceding embodiments of the invention, no consideration is paid to the influence of a stepwise feeding increment $\Delta S$ of the patterning mask 8 and the workpiece 12 in the x-axis direction. It is however preferred to set the stepwise feeding increment $\Delta S$ smaller than a width $\Delta Wx$ of the excimer laser beam L1 on the patterning mask 8 in the x-axis direction to thereby uniformize the intensity distribution of the excimer laser beam when the patterning mask 8 and the workpiece 12 are fed stepwise in the x-axis direction.

With the teaching of the invention incarnated in the fifth embodiment thereof, it is contemplated to uniformize the intensity distribution of the excimer laser beam in the x-axis direction by setting the stepwise feeding increment $\Delta S$ smaller than the width $\Delta Wx$ of the excimer laser beam L1. The excimer laser beam irradiation apparatus according to the instant embodiment will be described by reference to FIGS. 10 and 11. Parenthetically, the excimer laser beam irradiation one for carrying out the instant embodiment of the invention can be implemented in an essentially same structure as the apparatus shown in FIG. 1.

The basic concept of the invention underlying the excimer laser beam irradiation apparatus now under consideration resides in that when the patterning mask 8 and the workpiece 12 are fed stepwise in the x-axis direction for repeating the irradiation with the excimer laser beam L2 along the y-axis direction, the patterning mask 8 and the workpiece 12 are moved in the direction (x-axis direction) orthogonally to the scan moving direction (y-axis direction) in which the patterning mask 8 and the workpiece 12 are moved for realizing the scanning operation described hereinbefore as well as to the optical axis of the imaging lens 11, wherein the stepwise feeding increment $\Delta S$ in the x-axis direction is set to be smaller than the width $\Delta Wx$ of the excimer laser beam L1 as viewed in the x-axis direction.

Figure 10A:
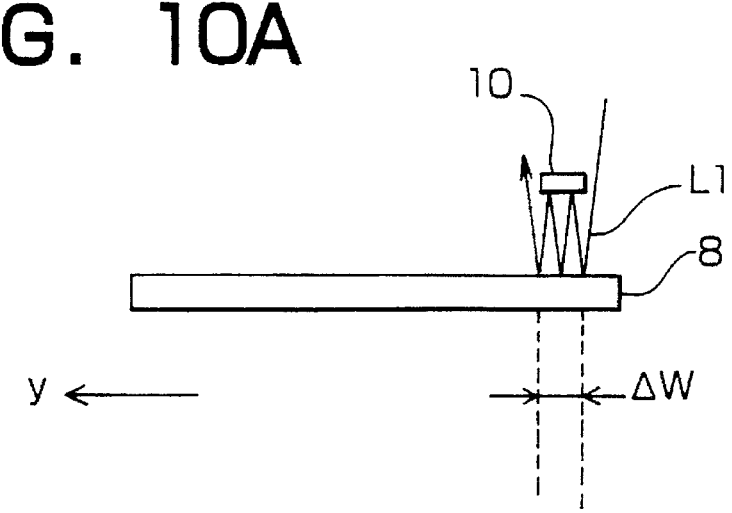
FIG. 10A is a side view showing a multiple reflection arrangement comprised of a patterning mask and a high reflectivity mirror, as viewed in the x-axis direction.
Figure 10B:
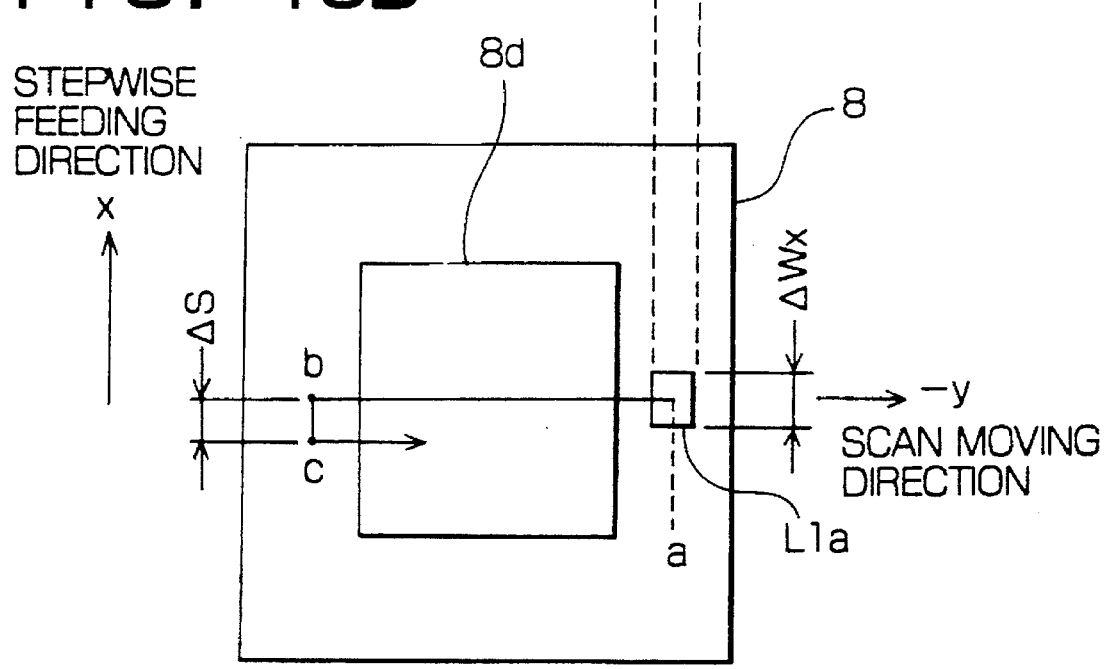
FIG. 10B is a top plan view for illustrating schematically a stepwise feeding of the patterning mask in the x-axis direction.

FIG. 10A is a side view showing a multiple reflection arrangement of the patterning mask 8 and the high reflectivity mirror 10 for the excimer laser beam L1, as viewed in the x-axis direction, and FIG. 10B is a top plan view illustrating schematically positions irradiated with the excimer laser beam L2 and an effective pattern area on the patterning mask 8.

Referring to FIG. 10B, the excimer laser beam L1 undergoing the multiple reflections on the patterning mask 8 and projected at the position L1a has a center point located at a position a on the y-axis. In the figure, the width of the excimer laser beam L1 on the patterning mask 8 in the x-axis direction is designated by $\Delta Wx$, the stepwise feeding increment of the patterning mask 8 in x-axis direction is designated by $\Delta S$ and the center point or position of the excimer laser beam L1 after the stepwise feeding is designated by c.

Figure 11A:
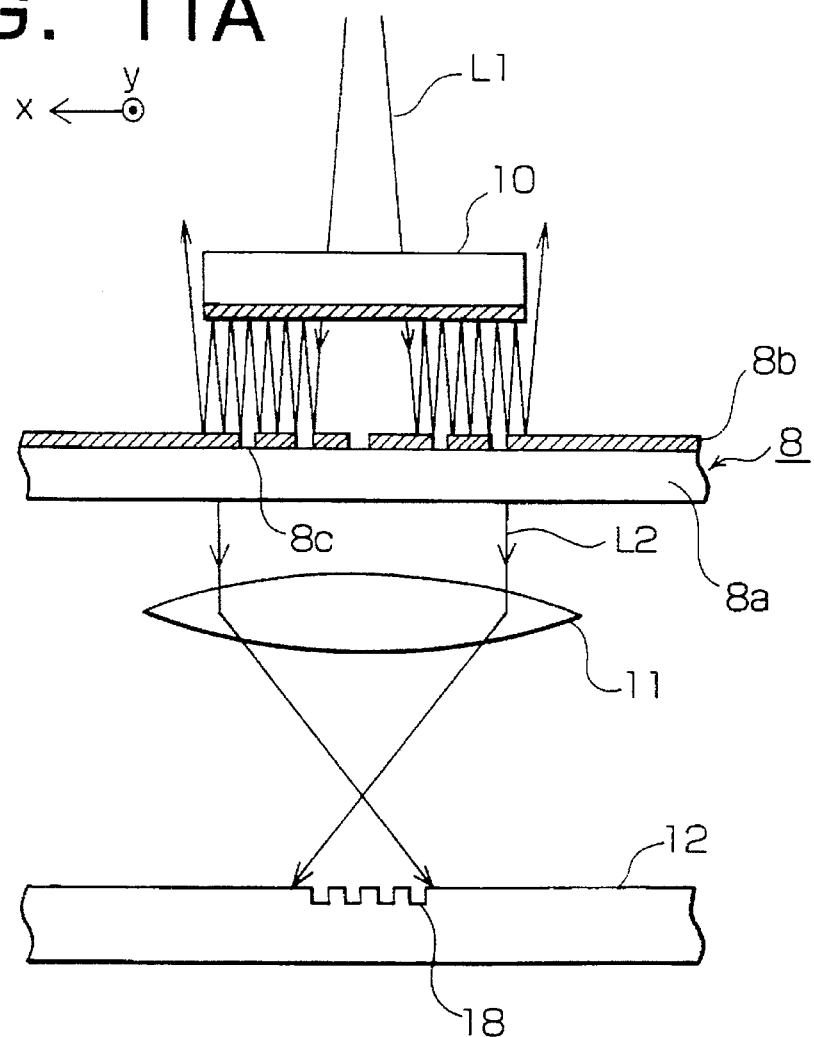
FIG. 11A is a side view showing multiple reflection of an excimer laser beam between a patterning mask and a high reflectivity mirror in the x-axis direction together with an imaging lens and a workpiece.
Figure 11B:
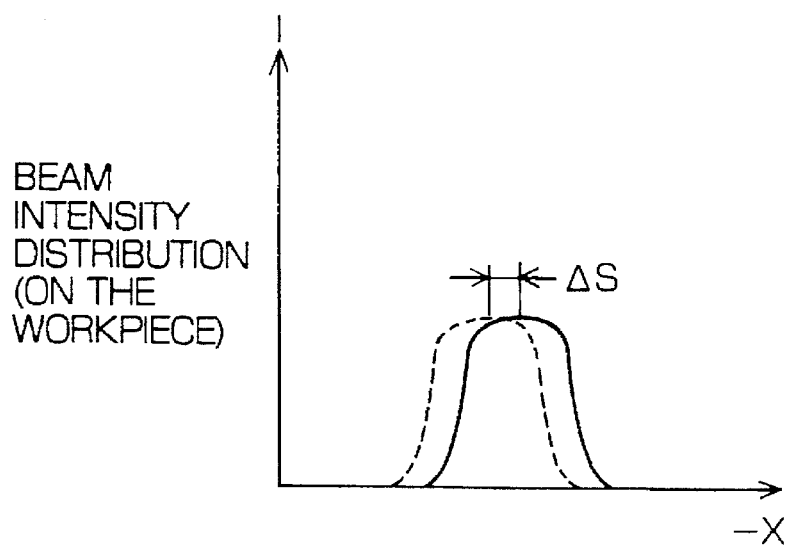
FIG. 11B is a view for graphically illustrating an intensity distribution of an excimer laser beam on a workpiece as viewed in the x-axis direction.

FIG. 11A is a side elevational view as viewed in the y-axis direction for showing an arrangement of the patterning mask 8 and the high reflectivity mirror 10 between which the excimer laser beam L1 undergoes the multiple reflections together with the imaging lens 11 and the workpiece 12, and FIG. 11B is a view for illustrating intensity distribution of the workpiece 12 as viewed along the x-axis direction thereof.

Now, description will be directed to operation of the excimer laser beam irradiation apparatus according to the instant embodiment of the invention by reference to FIG. 1 together with FIGS. 10 and 11.

In the synchronous scanning operation of the patterning mask 8 and the workpiece 12, the control unit 16A moves the patterning mask 8 in the minus (−) y-axis direction so that the center point of the excimer laser beam L1 moves from the position a to the position b (refer to FIG. 10) for effecting scanning operation in appearance in order to make uniform the intensity distribution of the excimer laser beam in the y-axis direction.

Subsequently, the patterning mask 8 is fed by the increment $\Delta S$ in the x-axis direction to thereby shift stepwise the excimer laser beam L1 from the position b to the position c in appearance. In succession, the synchronous scanning displacement of the patterning mask 8 is performed in the y-axis direction. In this manner, irradiation of the workpiece 12 with the excimer laser beam L2 in the y-axis direction is repeated sequentially in the x-axis direction.

The stepwise feeding increment ΔS in the x-axis direction is set to be smaller than the width ΔWx (FIG. 10B) of the excimer laser beam L1 as viewed in the x-axis direction so that the following condition is satisfied.

$$\Delta S < \Delta Wx/2$$

Further, the width ΔWx in the x-axis direction of the excimer laser beam L1 undergoing the multiple reflections is so determined as illustrated in FIG. 11A. More specifically, the excimer laser beam L1 impinges on the high reflectivity mirror 10 at the center thereof and undergoes reflections repetitively toward both ends of the high reflectivity mirror 10. In that case, the intensity distribution of the excimer laser beam L1 in the x-axis direction is such as indicated by a solid line curve or a broken line curve in FIG. 11B. As can be seen in the figure, the intensity distribution of the excimer laser beam L1 is subjected to variation more or less in the x-axis as well.

As is indicated by the shift of the broken line curve to the solid line curve in FIG. 11B, non-uniformity in the intensity distribution of the excimer laser beam L1 in the stepwise feeding direction can be suppressed to a minimum by setting the stepwise feeding increment ΔS to be smaller than the width ΔWx of the excimer laser beam L1. In this manner, non-uniformity in processing the workpiece 12 which is ascribable to non-uniformity of the intensity distribution of the excimer laser beam in the x-axis direction can be minimized.

Embodiment 6

In the excimer laser beam irradiation apparatuses according to the preceding embodiments of the invention, no consideration is paid to an inter-pulse scanning displacement Δy of the patterning mask 8 and the workpiece 12 in the y-axis direction (i.e., increment in the scanning displacement of the patterning mask 8 and the workpiece 12 effected during a period between the successive pulses of the excimer laser beam L0, L1 or L2 in the y-axis direction). It is however preferred to set the inter-pulse scanning displacement Δy for the excimer laser beam smaller than the reflection shift distance (width in appearance) ΔW of the excimer laser beam L1 (i.e., length or distance for which the excimer laser beam L1 is shifted in the y-axis direction while being reflected) in order to uniformize the intensity distribution (cumulated intensity level) of the excimer laser beam L1.

With the teaching of the invention incarnated in the sixth embodiment thereof, it is contemplated to further uniformize the intensity distribution of the excimer laser beam by setting the inter-pulse scanning displacement Δy for the excimer laser beam L0, L1 or L2 to be smaller than the reflection shift distance ΔW of the excimer laser beam L1.

Figure 12A:
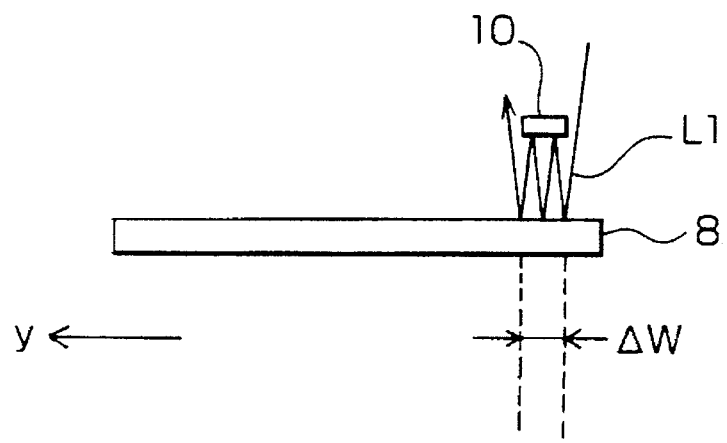
FIG. 12A is a side elevational view showing a multiple reflection arrangement according to still further embodiment of the invention as viewed in the x-axis direction.
Figure 12B:
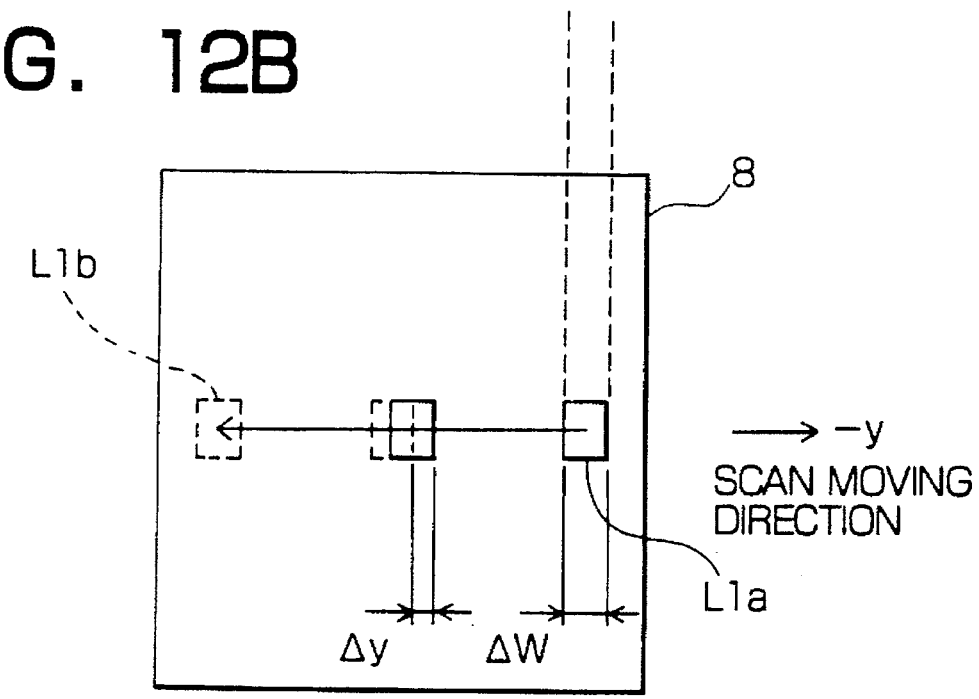
FIG. 12B is a top plan view for illustrating schematically positions which the excimer laser beam assumes on the patterning mask.

FIG. 12A is a side view showing a multiple reflection arrangement according to the sixth embodiment of the invention as viewed in the x-axis direction, and FIG. 12B is a plan view illustrating schematically positions which the excimer laser beam L1 assumes on the patterning mask 8, wherein the inter-pulse scanning displacement is represented by Δy. Parenthetically, the excimer laser beam irradiation apparatus for carrying out the sixth embodiment of the invention can be implemented in an essentially same structure as the one shown in FIG. 1.

The concept of the invention underlying the excimer laser beam irradiation apparatus according to the instant embodiment can be seen in that the inter-pulse scanning displacement Δy of the patterning mask 8 and the workpiece 12 during the synchronous scanning displacement thereof is so controlled as to be smaller than the reflection shift distance ΔW of the excimer laser beam L1 by changing the scan moving speed v of the patterning mask 8 and the workpiece 12 under the control of the control unit 16A.

For simplification of the elucidation, the inter-pulse scanning displacement Δy only of the patterning mask 8 and the scan moving speed v will be considered in the following description, being understood that the following description also applied equally for the workpiece 12.

Further, the control unit 16A is so arranged as to change the oscillation repetition frequency f of the excimer laser oscillator 1 so that the inter-pulse scanning displacement Δy of the patterning mask 8 and the workpiece 12 during the synchronous scanning displacement is smaller than the reflection shift distance ΔW of the excimer laser beam L1.

In the synchronous scanning displacement of the patterning mask 8 and the workpiece 12, the patterning mask 8 is moved for the scanning operation even during a period which intervenes between the successive shots of pulses of the excimer laser beam L1 (i.e., during a period in which irradiation of the excimer laser beam L1 is intercepted pulsewise). The distance for which the patterning mask 8 is moved during the period between the successive pulses of the excimer laser beam L1 (i.e., pulse-off period, to say in another way) is represented by Δy and referred to as the inter-pulse scanning displacement. The control unit 16A controls the scan moving speed v of the patterning mask 8 such that the inter-pulse scanning displacement Δy is smaller than the reflection shift distance ΔW of the excimer laser beam L1.

Furthermore, the control unit 16A controls the oscillation repetition frequency f of the excimer laser oscillator 1 such that the inter-pulse scanning displacement Δy of the patterning mask 8 is shorter than the reflection shift distance ΔW of the excimer laser beam L1.

Of course, the control unit 16A may be so programmed as to control either one of the scan moving speed v or the oscillation repetition frequency f so that the aforementioned condition (i.e., the inter-pulse scanning displacement Δy is smaller than the reflection shift distance ΔW) is satisfied.

In this conjunction, the inter-pulse scanning displacement Δy of the patterning mask 8 for the excimer laser beam L1 can be determined on the basis of the oscillation repetition frequency f and the scan moving speed v in accordance with the following expression:

$$\Delta y = v/f$$

On the other hand, relation between the inter-pulse scanning displacement Δy and the reflection shift distance ΔW of the excimer laser beam L1 can be given by $$\Delta y < k6 \cdot \Delta W$$

where k6 represents a proportional constant which is selected to satisfy the condition that 1>k6>0.

As can be seen from the above, the inter-pulse scanning displacement Δy becomes smaller as the scan moving speed v is lowered. Further, the inter-pulse scanning displacement Δy becomes smaller as the oscillation repetition frequency f is increased.

In an experiment conducted by the inventors, processing uniformity with dispersion on the order of ±10% could be realized for the intensity distribution of the excimer laser beams L1 and L2 when the proportional k6 is set to be 0.2. When the uniformity for the intensity distribution is to be realized with dispersion on the order of ±2%, the proportional coefficient k6 should be selected to be 0.05 or so.

In this manner, by decreasing the inter-pulse scanning displacement Δy, the intensity distribution (cumulated intensity level) of the excimer laser beam L2 can further be uniformized, whereby the processing uniformity for the workpiece 12 can correspondingly be enhanced.

Embodiment 7

In the case of the preceding embodiments, no consideration is paid to the presence of an irradiation-unnecessary region in the irradiated area 12a on the workpiece 12 (see FIG. 9). It is however preferable to inhibit the irradiation-unnecessary region (i.e., the region which need not be irradiated) from being irradiated with the excimer laser beam L2 during the synchronous scanning displacement.

The seventh embodiment of the present invention is directed to an arrangement which inhibits the irradiation of the excimer laser beam L2 for the irradiation-unnecessary region.

Figure 13A:
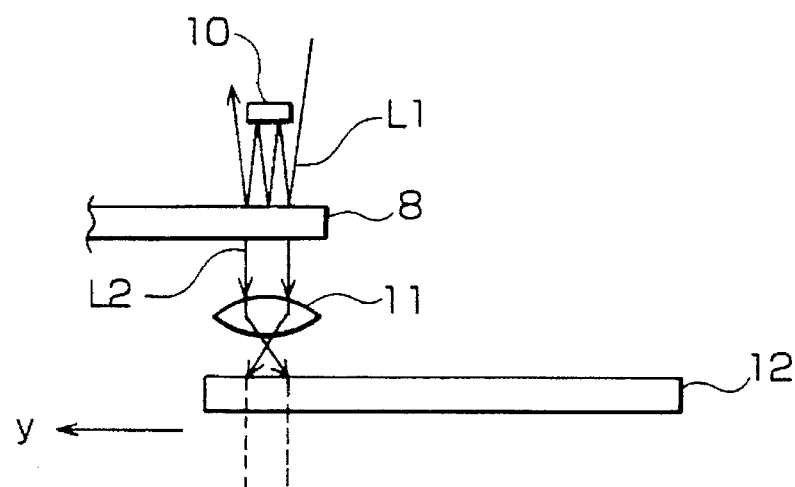
FIG. 13A is a side elevational view showing an arrangement of a multiple reflection section, an imaging lens and a workpiece as viewed in the x-axis direction in another embodiment of the present invention.
Figure 13B:
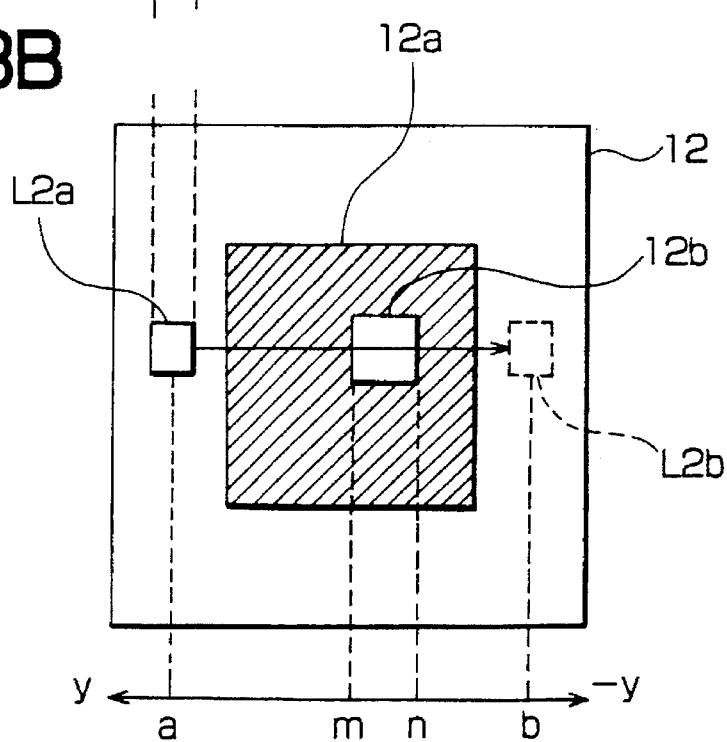
FIG. 13B is a top plan view showing position on a workpiece at which an excimer laser beam is projected.

FIG. 13A is a side view showing an arrangement of a multiple reflection section, the imaging lens 11 and the workpiece 12 as viewed in the x-axis direction and FIG. 13B is a top plan view showing positions on the workpiece 12 at which the excimer laser beam L2 is projected. An irradiation-unnecessary region (or not-to-be processed region, to say in another way) within the irradiated area 12a is designated by reference character 12b with both end positions of the irradiation-unnecessary region 12b are designated by m and n, respectively. Parenthetically, the excimer laser beam irradiation apparatus for carrying out the instant embodiment of the invention may be of a same structure as the one shown in FIG. 1.

In the case of the excimer laser beam irradiation apparatus according to the instant embodiment of the invention, the control unit 16A is so designed as to stop the operation of the excimer laser oscillator 1 for the irradiation-unnecessary region 12b, if present in the irradiated area 12a of the workpiece 12, during the synchronous scanning displacement.

Alternatively, there may be provided an intercepting plate (not shown) which can selectively be inserted into an optical path of the excimer laser beam L0, L1 or L2 under the control of the control unit 16A. In this case, it is assumed that the intercepting plate is inserted in the optical path, for example, of the excimer laser beam L2 during a period in which the irradiation-unnecessary region 12b within the irradiated area 12a undergoes the synchronous scanning displacement to thereby inhibit the excimer laser beam L2 from irradiating the workpiece 12.

Referring to FIGS. 13A and 13B, when the workpiece 12 is moved in the y-axis direction in synchronism with the patterning mask 8 for the scanning operation, the position at which the workpiece 12 is irradiated with the excimer laser beam L2 moves from a position L2a (shown in solid in FIG. 13B) to a position L2b (shown in phantom in FIG. 13B).

In that case, during a period corresponding to a distance between the positions m and n delimiting the irradiation-unnecessary region 12b, operation of the excimer laser oscillator 1 is stopped or alternatively the intercepting plate is inserted in the optical path of the excimer laser beam L0, L1 or L2.

Thus, the irradiation-unnecessary region 12b is prevented from irradiation with the excimer laser beam L2, whereby only the regions within the irradiated area 12a which have to be processed can selectively be irradiated with the excimer laser beam L2. Consequently, the useless irradiation and processing of the workpiece 12 can be prohibited, whereby the excimer laser beam irradiation apparatus can be protected against unnecessary operation with the use life thereof being correspondingly extended. Of course, high reliability can be ensured for the processing performance of the excimer laser beam irradiation apparatus.

Parenthetically, the positions m and n delimiting the irradiation-unnecessary region 12b may previously be stored as measured data in a memory incorporated in the control unit 16A.

Although the synchronous scanning displacement and the stepwise feeding operation have been described in connection with only one of the patterning mask 8 or the workpiece 12 in the foregoing description of the various embodiments, it goes without saying that both the patterning mask 8 and the workpiece 12 are subjected to the synchronous displacement control and thus undergo the synchronous scanning displacement and the simultaneous stepwise feeding operation.

Many features and advantages of the present invention are apparent form the detailed description and thus it is intended by the appended claims to cover all such features and advantages of the system which fall within the true spirit and scope of the invention. Further, since numerous modifications and combinations will readily occur to those skilled in the art, it is not intended to limit the invention to the exact construction and operation illustrated and described.

By way of example, the individual embodiments may be combined selectively and appropriately for enhancing uniformization of the intensity distribution of the excimer laser beam and ensuring higher operation reliability for the excimer laser beam irradiation apparatus as well that of the optical processing apparatus. Furthermore, although it has been described in conjunction With the third and fourth embodiments that either the oscillation repetition frequency f or the scan moving speed v is controlled, it should be appreciated that both of them can be controlled in appropriate combinations substantially to the same effect.

Accordingly, all suitable modifications and equivalents may be resorted to, falling within the spirit and scope of the invention.

What is claimed is:

1. An excimer laser beam irradiation apparatus for processing a workpiece by using an excimer laser beam, comprising:

an excimer laser oscillator for emitting an excimer laser beam;

a patterning mask having light-transmissive portions for allowing said excimer laser beam emitted from said excimer laser oscillator to pass therethrough and a reflecting layer for reflecting said excimer laser beam, said light-transmissive portions forming a pattern to be formed in said workpiece;

reflecting means disposed in opposition to said reflecting layer of said patterning mask for reflecting the excimer laser beam reflected from said reflecting layer toward said patterning mask so that said excimer laser beam undergoes multiple reflections between said reflecting means and said patterning mask while being positionally shifted;

an imaging optical system for imaging a pattern of the excimer laser beam transmitted through said patterning mask onto said workpiece for irradiation thereof;

a workpiece moving mechanism for moving said workpiece in a direction orthogonal to an optical axis of said imaging optical system;

a mask moving mechanism for moving said patterning mask in a direction orthogonal to the optical axis of said imaging optical system; and control means for controlling said excimer laser oscillator, said workpiece moving mechanism and said mask moving mechanism;

wherein said control means controls said workpiece moving mechanism and said mask moving mechanism such that said patterning mask and said workpiece are displaced synchronously with each other along a same axis for allowing said workpiece to be scanned with said excimer laser beam during a synchronous scanning displacement in a scan moving direction which coincides with a direction in which said excimer laser beam shifts while undergoing said multiple reflections between said patterning mask and said reflecting means.

2. An excimer laser beam irradiation apparatus according to claim 1, said excimer laser oscillator and said reflecting means being disposed stationarily;

said reflecting means and said patterning mask being disposed substantially in parallel to each other; and said excimer laser beam being caused to impinge onto said patterning mask at a predetermined angle of inclination without being interfered by said reflecting means;

wherein said patterning mask and said workpiece are moved along said same axis in directions opposite to each other during said synchronous scanning displacement.

3. An excimer laser beam irradiation apparatus according to claim 1, wherein said control means controls said workpiece moving mechanism and said mask moving mechanism such that a distance for which said patterning mask and said workpiece are displaced synchronously while being scanned with said excimer laser beam is longer than a length of an effective pattern area of said patterning mask in which a pattern to be imaged onto said workpiece is formed.

4. An excimer laser beam irradiation apparatus according to claim 1, wherein said control means selects positions at which said patterning mask and said workpiece are, respectively, caused to start said synchronous scanning displacement such that said patterning mask and said workpiece are displaced at a stabilized speed during said synchronous scanning displacement at least over a distance which corresponds to an area of said workpiece to be irradiated with said excimer laser beam.

5. An excimer laser beam irradiation apparatus according to claim 1, further comprising:

speed measuring means for detecting a speed at which said patterning mask and said workpiece are moved during said synchronous scanning displacement;

wherein said control means is so designed that when said speed measuring means detects that a scan moving speed at which said patterning mask and said workpiece are displaced during said synchronous scanning displacement changes within an area irradiated with said excimer laser beam, said control means controls an oscillation repetition frequency of said excimer laser oscillator so that said oscillation repetition frequency decreases below a predetermined frequency when said scan moving speed is lower than a predetermined speed, whereas said control means controls said oscillation repetition frequency so that said oscillation repetition frequency increases beyond said predetermined frequency when said scan moving speed is higher than said predetermined speed.

6. An excimer laser beam irradiation apparatus according to claim 1, further comprising:

thickness measuring means provided in association with said control means for measuring a thickness of said workpiece;

wherein said control means is designed such that when said thickness measuring means detects that a thickness of said workpiece changes during said synchronous scanning displacement, said control means controls an oscillation repetition frequency of said excimer laser oscillator so that said oscillation repetition frequency increases beyond a predetermined frequency when said thickness of said workpiece is greater than a predetermined thickness, whereas said control means controls said oscillation repetition frequency so that said oscillation repetition frequency decreases below said predetermined frequency when said thickness of said workpiece is smaller than said predetermined thickness.

7. An excimer laser beam irradiation apparatus according to claim 6, wherein said predetermined frequency and said predetermined thickness are so selected that the said workpiece having said predetermined thickness can be processed uniformly and stably with said excimer laser beam having said predetermined frequency when said workpiece is moved at a given speed during said synchronous scanning displacement.

8. An excimer laser beam irradiation apparatus according to claim 1, further comprising:

thickness measuring means provided in association with said control means for measuring a thickness of said workpiece;

wherein said control means is designed such that when said thickness measuring means detects that a thickness of said workpiece changes during said synchronous displacement, said control means controls a scan moving speed of said patterning mask and said workpiece during said synchronous scanning displacement so that said scan moving speed decreases below a predetermined speed when said thickness of said workpiece is greater than a predetermined thickness, whereas said control means controls said scan moving speed of said patterning mask and said workpiece so that said scan moving speed increases beyond said predetermined speed when said thickness of said workpiece is smaller than said predetermined thickness.

9. An excimer laser beam irradiation apparatus according to claim 8, wherein said predetermined speed and said predetermined thickness are so selected that the said workpiece having said predetermined thickness can be processed uniformly and stably with said excimer laser beam having said predetermined frequency when said workpiece is moved at said predetermined speed during said synchronous scanning displacement.

10. An excimer laser beam irradiation apparatus according to claim 1, further comprising:

workpiece processability decision means for deciding whether a material of said workpiece is difficult to process or easy to process;

wherein said control means is so designed that when it is detected by said workpiece processability decision means that a material of said workpiece changes within an area irradiated with said excimer laser beam during said synchronous scanning displacement, said control means controls an oscillation repetition frequency of said excimer laser oscillator so that said oscillation repetition frequency decreases below a predetermined frequency when a material of said workpiece is easy to process, whereas said control means controls said oscillation repetition frequency so that said oscillation repetition frequency increases beyond said predetermined frequency when said material of said workpiece is difficult to process.

11. An excimer laser beam irradiation apparatus according to claim 10, said processing difficulty and said processing easiness being previously determined in terms of an etching rate at which the material of said workpiece is etched away under irradiation of a single-shot pulse of said excimer laser beam;

wherein information concerning said processing difficulty and said processing easiness of the workpiece material is stores in a memory for each of regions within an area of said workpiece which is to be irradiated with said excimer laser beam, said regions differing one another in respect to said material; and wherein said memory and said workpiece processability decision means are provided in association with said control means.

12. An excimer laser beam irradiation apparatus according to claim 1, further comprising:

workpiece processability decision means for deciding whether a material of said workpiece is difficult to process or easy to process;

wherein said control means is so designed that when it is detected by said workpiece processability decision means that a material of said workpiece changes within an irradiated area irradiated with said excimer laser beam during said synchronous scanning displacement, said control means controls the scan moving speed of said patterning mask and said workpiece during said synchronous scanning displacement so that said scan moving speed increases beyond a predetermined speed when a material of said workpiece is easy to process, whereas said control means controls said scan moving speed of said patterning mask and said workpiece so that said scan moving speed decreases below said predetermined speed when said material of said workpiece is difficult to process.

13. An excimer laser beam irradiation apparatus according to claim 12, said processing difficulty and said processing easiness being previously determined in terms of an etching rate at which the material of said workpiece is etched away under irradiation of a single-shot pulse of said excimer laser beam;

wherein information concerning said processing difficulty and said processing easiness of the workpiece material is stored in a memory for each of regions within an area of said workpiece which is to be irradiated with said excimer laser beam, said regions differing one another in respect to said material; and wherein said memory and said workpiece processability decision means are provided in association with said control means.

14. An excimer laser beam irradiation apparatus according to claim 1, said mask moving mechanism and said workpiece moving mechanism including stepwise feeding means for displacing stepwise said patterning mask and said workpiece under the control of said control means in a direction orthogonal to both an optical axis of said imaging optical system and said scan moving direction in which said patterning mask and said workpiece are moved during said synchronous scanning displacement for thereby allowing irradiation of said workpiece with said excimer laser beam to be repeated in said orthogonal direction;

wherein said stepwise displacement in said orthogonal direction is selected to be smaller than a reflectional shift distance for which said impinging excimer laser beam shifts positionally in said orthogonal direction while undergoing multiple reflections between said patterning mask and said reflecting means.

15. An excimer laser beam irradiation apparatus according to claim 1, wherein said control means is so designed as to control said scan moving speed of said patterning mask and said workpiece so that an inter-pulse scanning displacement for which said patterning mask and said workpiece is moved in said scan moving direction during a period intervening successive pulses of said excimer laser beam is smaller than the reflectional shift distance for which said excimer laser beam shifts positionally while undergoing multiple reflections between said patterning mask and said reflecting means.

16. An excimer laser beam irradiation apparatus according to claim 1, wherein said control means is so designed as to control the oscillation repetition frequency of said excimer laser oscillator so that an inter-pulse scanning displacement for which said patterning mask and said workpiece is moved in said scan moving direction during a period intervening successive pulses of said excimer laser beam is smaller than the reflectional shift distance for which said excimer laser beam shifts positionally while undergoing multiple reflections between said patterning mask and said reflecting means.

17. An excimer laser beam irradiation apparatus according to claim 1, wherein said control means is so designed as to stop operation of said excimer laser oscillator for an irradiation-unnecessary region during said synchronous scanning displacement, if said irradiation-unnecessary region is present in an area to be irradiated with said workpiece.

18. An excimer laser beam irradiation apparatus according to claim 17, wherein information concerning irradiation-unnecessary region is stored in a memory provided in association with said control means.

19. An excimer laser beam irradiation apparatus according to claim 1, further comprising:

an intercepting plate which can selectively be inserted into an optical path of said excimer laser beam under the control of said control means;

wherein said control means inserts said intercepting plate in said optical path during said synchronous scanning displacement of said patterning mask and said workpiece to thereby inhibit said excimer laser beam from irradiating said workpiece for an irradiation-unnecessary region, if said irradiation-unnecessary region is present in an area to be irradiated with said workpiece.

20. An excimer laser beam irradiation apparatus according to claim 19, wherein information concerning irradiation-unnecessary region is stored in a memory provided in association with said control means.

* * * * *